(12) United States Patent
Gross et al.

(10) Patent No.: US 9,100,153 B2
(45) Date of Patent: Aug. 4, 2015

(54) METHODS AND SYSTEMS FOR IMPROVING ITERATIVE SIGNAL PROCESSING

(75) Inventors: Warren J. Gross, Montreal (CA); Shie Mannor, Haifa (IL); Saeed Sharifi Tehrani, San Diego, CA (US)

(73) Assignee: THE ROYAL INSTITUTION FOR THE ADVANCEMENT OF LEARNING/MCGILL UNIVERSITY, Montreal, Quebec (CA)

( * ) Notice: Subject to any disclaimer, the term of this patent is extended or adjusted under 35 U.S.C. 154(b) by 961 days.

(21) Appl. No.: 13/150,971

(22) Filed: Jun. 1, 2011

(65) Prior Publication Data

US 2011/0293045 A1    Dec. 1, 2011

Related U.S. Application Data

(63) Continuation-in-part of application No. 12/566,829, filed on Sep. 25, 2009, now abandoned.

(60) Provisional application No. 61/099,923, filed on Sep. 25, 2008.

(51) Int. Cl.
*H04L 1/00*    (2006.01)

(52) U.S. Cl.
CPC ..................... *H04L 1/005* (2013.01)

(58) Field of Classification Search
USPC ............... 375/219, 222, 220, 240.26–240.27, 375/265, 259, 262, 285, 284, 295, 299, 316, 375/340, 341, 343, 346, 347
See application file for complete search history.

(56) References Cited

U.S. PATENT DOCUMENTS 6,320,520 B1 *    11/2001    Luby ................................ 341/50
6,405,341 B1 *    6/2002    Maru ............................ 714/780
(Continued)

FOREIGN PATENT DOCUMENTS

WO    2008/034254 A1    3/2008
WO    2008/124921 A1    10/2008
(Continued)

OTHER PUBLICATIONS

Brown et al., "Stochastic Neural Computation I: Computational Elements", IEEE Transactions on Computers, vol. 50, No. 9, Sep. 2001, pp. 891-905.

(Continued)

*Primary Examiner* — Linda Wong
(74) *Attorney, Agent, or Firm* — Morris & Kamlay LLP

(57) ABSTRACT

A method for iteratively decoding a set of encoded samples received from a transmission channel is provided. A data signal indicative of a noise level of the transmission channel is received. A scaling factor is then determined in dependence upon the data signal and the encoded samples are scaled using the scaling factor. The scaled encoded samples are then iteratively decoded. Furthermore, a method for initializing edge memories is provided. During an initialization phase initialization symbols are received from a node of a logic circuitry and stored in a respective edge memory. The initialization phase is terminated when the received symbols occupy a predetermined portion of the edge memory. An iterative process is executed using the logic circuitry storing output symbols received from the node in the edge memory and a symbol is retrieved from the edge memory and provided as output symbol of the node. Yet further an architecture for a high degree variable node is provided. A plurality of sub nodes forms a variable node for performing an equality function in an iterative decoding process. Internal memory is interposed between the sub nodes such that the internal memory is connected to an output port of a respective sub node and to an input port of a following sub node, the internal memory for providing a chosen symbol if a respective sub node is in a hold state, and wherein at least two sub nodes share a same internal memory.

21 Claims, 16 Drawing Sheets

(56) References Cited

U.S. PATENT DOCUMENTS

| | | | |
|---|---|---|---|
| 6,415,243 B1* | 7/2002 | Mann | 702/181 |
| 8,095,860 B2 | 1/2012 | Gross et al. | |
| 8,108,758 B2 | 1/2012 | Gross et al. | |
| 8,108,760 B2 | 1/2012 | Gross et al. | |
| 2006/0036930 A1* | 2/2006 | Luby et al. | 714/786 |
| 2008/0002778 A1* | 1/2008 | Said et al. | 375/246 |
| 2008/0077839 A1 | 3/2008 | Gross et al. | |
| 2008/0256343 A1 | 10/2008 | Gross et al. | |
| 2008/0294970 A1* | 11/2008 | Gross et al. | 714/801 |
| 2009/0031199 A1* | 1/2009 | Luby et al. | 714/800 |
| 2009/0100313 A1 | 4/2009 | Gross et al. | |
| 2010/0017676 A1 | 1/2010 | Gross et al. | |
| 2010/0074381 A1 | 3/2010 | Gross et al. | |
| 2011/0231731 A1 | 9/2011 | Gross et al. | |
| 2011/0282828 A1 | 11/2011 | Precup et al. | |
| 2011/0293045 A1 | 12/2011 | Gross et al. | |
| 2012/0054576 A1 | 3/2012 | Gross et al. | |

FOREIGN PATENT DOCUMENTS

| | | | |
|---|---|---|---|
| WO | 2008/141453 | A1 | 11/2008 |
| WO | 2009/046534 | A1 | 4/2009 |
| WO | 2010/006430 | A1 | 1/2010 |
| WO | 2011/140632 | A1 | 11/2011 |

OTHER PUBLICATIONS

Gaudet et al., "Iterative Decoding Using Stochastic Computation", Electronic Letters, vol. 39, No. 3, Feb. 6, 2003, pp. 299-301.

Gross et al., "Stochastic Implementation of LDPC Decoders", Proceedings of the Thirty-Ninth Asilomar Conference on Signals, Systems and Computers, Oct. 30-Nov. 2, 2005, pp. 713-717.

Rapley et al., "On the Simulation of Stochastic Iterative Decoder Architectures", Canadian Conference on Electrical and Computer Engineering—CCECE, pp. 1868-1871, 2005.

Rapley et al., "Stochastic Iterative Decoding on Factor Graphs", Proc. 3rd Int. Symp. on Turbo Codes and Related Topics 2003, pp. 507-510.

Tehrani et al., "An Area-Efficient FPGA-Based Architecture for Fully-Parallel Stochastic LDPC Decoding", Proceedings of the IEEE Workshop on Signal Processing Systems, SiPS 2007, Proceedings, Oct. 17-19, 2007, pp. 255-260.

Tehrani et al., "Fully Parallel Stochastic LDPC Decoders", IEEE Transactions on Signal Processing, vol. 56, No. 11, Nov. 2008, pp. 5692-5703.

Tehrani et al., "Majority-Based Tracking Forecast Memories for Stochastic LDPC Decoding", IEEE Transactions on Signal Processing, vol. 58, No. 9, Sep. 2010, pp. 4883-4896.

Tehrani et al., "Stochastic Decoding of LDPC Codes", IEEE Communications Letters, vol. 10, No. 10, Oct. 2006, pp. 716-718.

Tehrani et al., "Tracking Forecast Memories for Stochastic Decoding", J Sign Process Syst, vol. 63, No. 1, 2011, pp. 117-127.

Tehrani et al., "Tracking Forecast Memories in Stochastic Decoders", Proceedings of the IEEE International Conference on Acoustics, Speech, and Signal Processing, ICASSP 2009, Apr. 19-24, 2009, Taipei, Taiwan, pp. 561-564.

Winstead et al., "Stochastic Iterative Decoders", Proceedings of the International Symposium on Information Theory, Sep. 4-9, 2005, pp. 1116-1120.

* cited by examiner

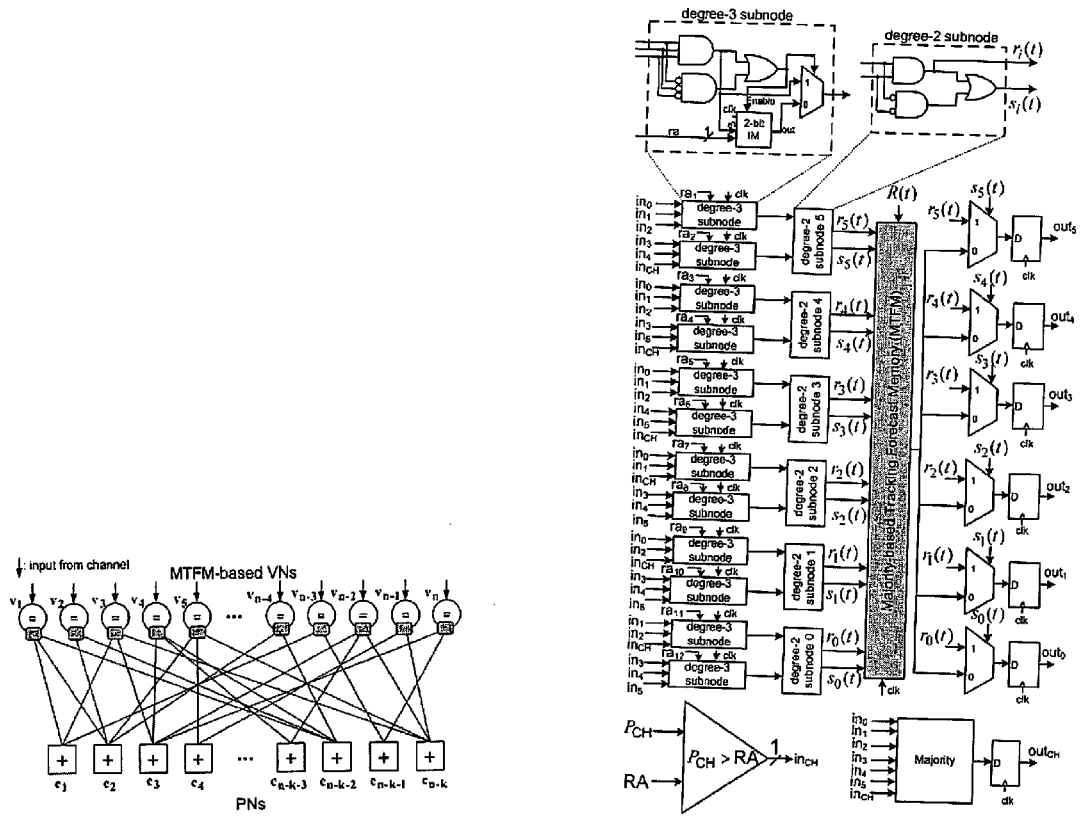
Fig. 17.
Fig. 18.
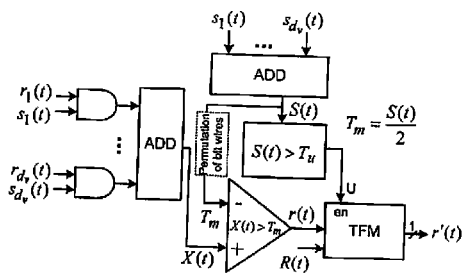
Fig. 19.
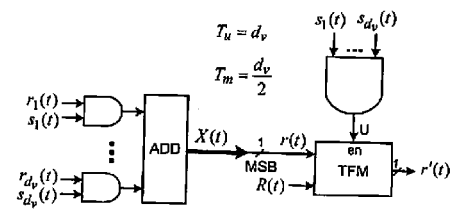
Fig. 20.

METHODS AND SYSTEMS FOR IMPROVING ITERATIVE SIGNAL PROCESSING

FIELD OF THE INVENTION

The instant invention relates to the field of iterative signal processing and in particular to methods and systems for improving performance of iterative signal processing.

BACKGROUND

Data communication systems comprise three components: a transmitter; a transmission channel; and a receiver. Transmitted data become altered due to noise corruption and channel distortion. To reduce the presence of errors caused by noise corruption and channel distortion, redundancy is intentionally introduced, and the receiver uses a decoder to make corrections. In modern data communication systems, the use of error correction codes plays a fundamental role in achieving transmission accuracy, as well as in increasing spectrum efficiency. Using error correction codes, the transmitter encodes the data by adding parity check information and sends the encoded data through the transmission channel to the receiver. The receiver uses the decoder to decode the received data and to make corrections using the added parity check information.

Stochastic computation was introduced in the 1960's as a method to design low precision digital circuits. Stochastic computation has been used, for example, in neural networks. The main feature of stochastic computation is that probabilities are represented as streams of digital bits which are manipulated using simple circuitry. Its simplicity has made it attractive for the implementation of error correcting decoders in which complexity and routing congestion are major problems, as disclosed, for example, in W. Gross, V. Gaudet, and A. Milner: "*Stochastic implementation of LDPC decoders*", in the 39th Asilomar Conf. on Signals, Systems, and Computers, Pacific Grove, Calif., November 2005.

A major difficulty observed in stochastic decoding is the sensitivity to the level of switching activity—bit transition—for proper decoding operation, i.e. switching events become too rare and a group of nodes become locked into one state. To overcome this "latching" problem, Noise Dependent Scaling (NDS), Edge Memories (EMs), and Internal Memories (IMs) have been implemented to re-randomize and/or de-correlate the stochastic signal data streams as disclosed, for example, in US Patent Application 20080077839 and U.S. patent application Ser. No. 12/153,749 (not yet published).

It would be desirable to provide methods and systems for improving performance of iterative signal processing such as, for example, stochastic decoding.

SUMMARY OF EMBODIMENTS OF THE INVENTION

In accordance with an embodiment of the invention there is provided a method comprising: receiving an input symbol of a stochastic signal data stream; determining a following probability of the stochastic signal data stream in dependence upon at least the input symbol and a present probability of the stochastic signal data stream; determining an output symbol of the stochastic signal data stream one of a pseudo randomly and a randomly based on the stochastic data stream; and, providing the output symbol.

In accordance with an embodiment of the invention there is provided a method method comprising: receiving an input symbol of a stochastic signal data stream; receiving at least one of a pseudo random number and a random number; and, re-randomizing the stochastic signal data stream in dependence upon the at least one of a pseudo random number and a random number.

In accordance with an embodiment of the invention there is provided a method stochastic decoder for decoding a set of encoded samples comprising a plurality of re-randomizing memories, each re-randomizing memory being disposed on an edge of the factor graph for storing symbols received from the corresponding edge and for providing one of the stored symbols selected in one of a deterministic, pseudo-random and random fashion at least some of the stored symbols provided in one of a pseudo-random and a random fashion.

In accordance with an aspect of the present invention there is provided a method for iteratively decoding a set of encoded samples comprising: receiving from a transmission channel the set of encoded samples; receiving a data signal indicative of a noise level of the transmission channel; determining a scaling factor in dependence upon the data signal; determining scaled encoded samples by scaling the encoded samples using the scaling factor; iteratively decoding the scaled encoded samples.

In accordance with an aspect of the present invention there is provided a method for iteratively decoding a set of encoded samples comprising: receiving the set of encoded samples; decoding the encoded samples using an iterative decoding process comprising: monitoring a level of a characteristic related to the iterative decoding process and providing a data signal in dependence thereupon; determining a scaling factor in dependence upon the data signal; and, scaling the encoded samples using the scaling factor.

In accordance with an aspect of the present invention there is provided a scaling system comprising: an input port for receiving a set of encoded samples, the set of encoded samples for being decoded using an iterative decoding process; a monitor for monitoring one of a noise level of a transmission channel used for transmitting the encoded samples and a level of a characteristic related to the iterative decoding process and providing a data signal in dependence thereupon; scaling circuitry connected to the input port and the monitor, the scaling circuitry for determining a scaling factor in dependence upon the data signal and for determining scaled encoded samples by scaling the encoded samples using the scaling factor; and, an output port connected to the scaling circuitry for providing the scaled encoded samples.

In accordance with an aspect of the present invention there is provided a method comprising: during an initialization phase receiving initialization symbols from a node of a logic circuitry; storing the initialization symbols in a respective edge memory; terminating the initialization phase when the received symbols occupy a predetermined portion of the edge memory; executing an iterative process using the logic circuitry storing output symbols received from the node in the edge memory; and, retrieving a symbol from the edge memory and providing the same as output symbol of the node.

In accordance with an aspect of the present invention there is provided a logic circuitry comprising: a plurality of sub nodes forming a variable node for performing an equality function in an iterative decoding process; internal memory interposed between the sub nodes such that the internal memory is connected to an output port of a respective sub node and to an input port of a following sub node, the internal memory for providing a chosen symbol if a respective sub node is in a hold state, and wherein at least two sub nodes share a same internal memory.

In some embodiments the stochastic decoder for decoding a set of encoded samples comprising at least a re-randomizing memory operational in dependence upon a majority of regenerative bits provided thereto. In some embodiment the re-randomizing memory is operational in dependence upon solely the regenerative bits to the exclusion of conservative bits.

BRIEF DESCRIPTION OF THE FIGURES

Exemplary embodiments of the invention will now be described in conjunction with the following drawings, in which:

FIG. 17 is a simplified block diagram of an MTFM-based stochastic decoder using one MTFM per VN;

FIG. 18 is a simplified block diagram of a structure of a degree-6 MTFM-based stochastic VN;

FIG. 19 is a simplified block diagram of a general architecture of an MTFM;

FIG. 20 is a simplified block diagram of the architecture of a reduced complexity MTFM;

DETAILED DESCRIPTION OF EMBODIMENTS OF THE INVENTION

Figure 1:
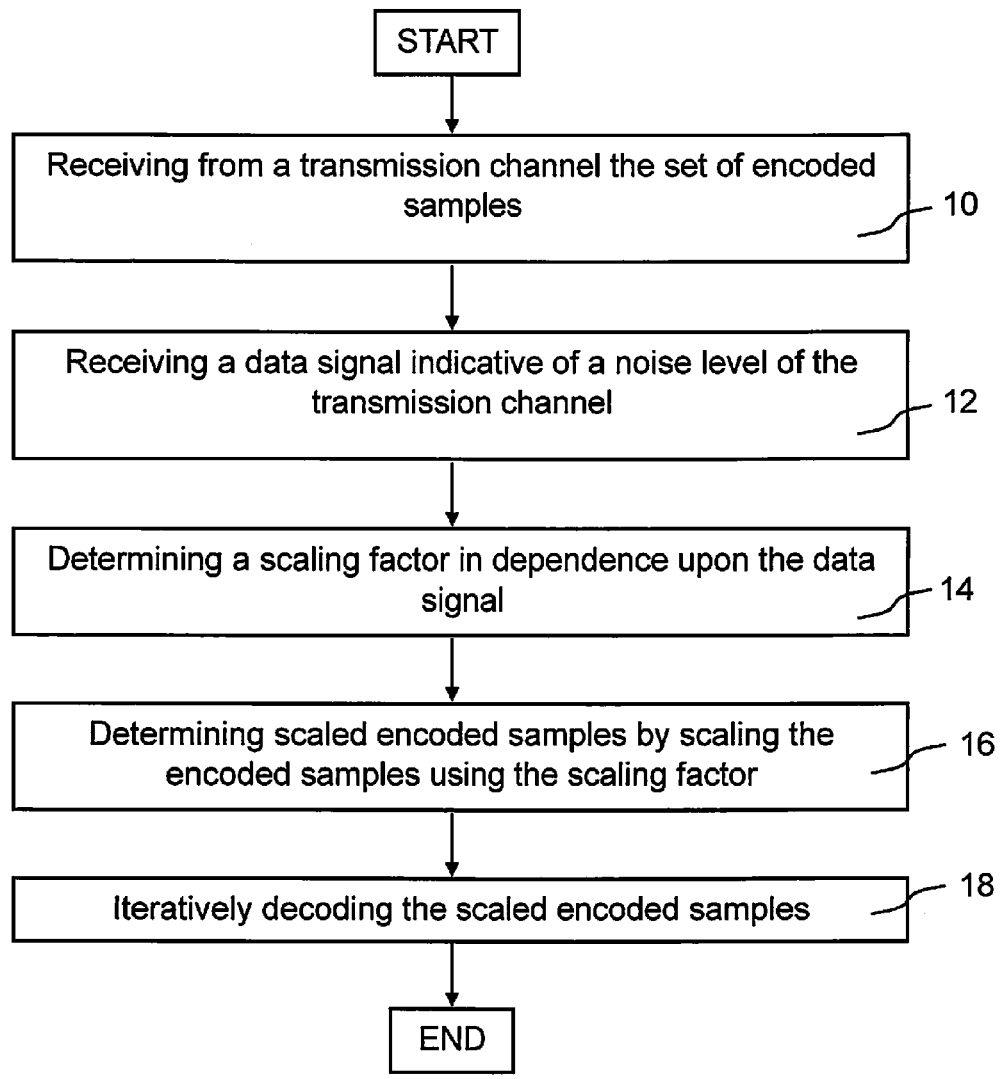
FIGS. 1 and 2 are simplified flow diagrams of a method for iteratively decoding a set of encoded samples according to embodiments of the invention.

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

While embodiments of the invention will be described for stochastic decoding for the sake of simplicity, it will become evident to those skilled in the art that the embodiments of the invention are not limited thereto, but are also applicable for other types of decoding such as, for example, bit-serial and bit flipping decoding, as well as for other types of stochastic processing.

In the description hereinbelow mathematical terms such as, for example, optimization are used for clarity, but as is evident to one skilled in the art these terms are not to be considered as being strictly absolute, but to also include degrees of approximation depending, for example, on the application or technology.

For simplicity, the various embodiments of the invention are described hereinbelow using a bitwise representation, but it will be apparent to those skilled in the art that they are also implementable using a symbol-wise representation, for example, symbols comprising a plurality of bits or non-binary symbols.

In Noise Dependent Scaling (NDS) channel reliabilities are scaled as follows:

$$L'=(\alpha N_0/Y)L, \qquad (1)$$

where L is the channel Log-Likelihood Ratio (LLR), $N_0$ is the power-spectral density of Additive White Gaussian Noise (AWGN) that exists in the channel and Y is a maximum limit of symbols, which is varying for different modulations, and $\alpha$ is a scaling factor—or NDS parameter which is, for example, determined such that: a Bit-Error-Rate (BER) performance of the decoder; a convergence behavior of the decoder; or a switching activity behavior of the decoder is optimized. The value of the scaling factor $\alpha$ for achieving substantially optimum performance depends on the type of code used.

Furthermore, the value of the scaling factor $\alpha$ for achieving substantially optimum performance also depends on the Signal-to-Noise-Ratio (SNR)—i.e. the noise level—of the transmission channel for a same type of code. This implies that, for example, at $SNR_1$ the decoder achieves optimum performance with $\alpha_1$, and at $SNR_2$ the decoder achieves optimum performance with $\alpha_2$.

Therefore, in the scaling method according to embodiments of the invention described herein below, the scaling factor $\alpha$ is not a fixed value but is varied in dependence upon the values of the SNR. In an embodiment according to the invention, a plurality of scaling factors corresponding to respective SNRs—SNR points or SNR ranges—are determined such that a predetermined performance—BER; convergence; switching activity—of the decoder is optimized. The determined scaling factors and the corresponding SNR values are then stored in a memory of a scaling system of the decoder. The scaling system of the decoder then determines the SNR of the transmission channel and according to the determined SNR retrieves the corresponding scaling factor from the memory. The scaling factors are determined, for example, by simulating the predetermined performance of the decoder or, alternatively, in an empirical fashion.

Alternatively, the plurality of scaling factors corresponding to respective SNRs—SNR points or SNR ranges—are determined and in dependence thereupon a relationship between the scaling factors and the SNRs is determined. The scaling system of the decoder then determines the SNR of the transmission channel and according to the determined SNR determines the scaling factor using the relationship.

Referring to FIG. 1, a simplified flow diagram of a method for iteratively decoding a set of encoded samples according to an embodiment of the invention is shown. At 10, the set of encoded samples is received from a transmission channel. At 12, a data signal indicative of a noise level of the transmission channel is received, for example, from a monitor circuit for monitoring the noise level of the transmission channel. A scaling factor is then determined in dependence upon the data signal—14, followed by determining scaled encoded samples by scaling the encoded samples using the scaling factor—16. The scaled encoded samples are then provided to a decoder for iteratively decoding—18.

In an embodiment, corresponding scaling factors are determined for a plurality of noise levels and the same are stored in memory. The scaling factor—at 14—is then determined by retrieving from the memory a corresponding scaling factor in dependence upon the received data signal. The scaling factors are determined, for example, as described above, in a simulated or empirical fashion and memory having stored therein data indicative of the corresponding scaling factors is disposed in the scaling system of a specific type of decoder.

Alternatively, corresponding scaling factors are determined for a plurality of noise levels and a relationship between the noise level and the scaling factor is then determined in dependence thereupon. The scaling factor—at 14—is then determined in dependence upon the received data signal and the relationship. For example, the determination of the scaling factor using the relationship is implemented in hardware.

In a scaling method according to an embodiment of the invention, the scaling factor is employed or changed during execution of the iterative decoding process. For example, a scaling factor is first determined based on the noise level of the transmission channel, as described above, and then changed during the iterative decoding process. Alternatively, the scaling factor is determined independent from the noise level of the transmission channel during execution of the iterative decoding process.

Figure 2:
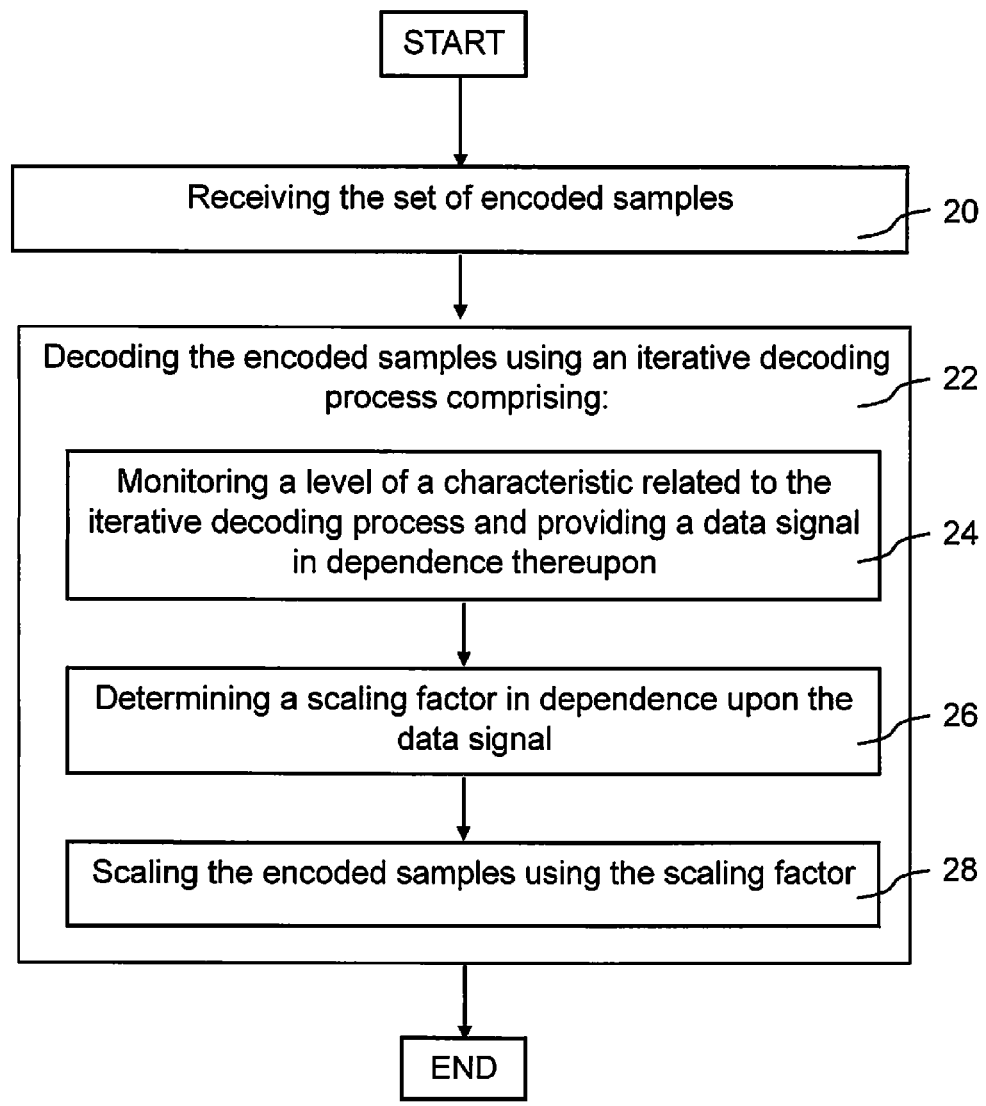

Referring to FIG. 2, a simplified flow diagram of a method for iteratively decoding a set of encoded samples according to an embodiment of the invention is shown. At 20, the set of encoded samples is received. At 22, the encoded samples are decoded using an iterative decoding process. The iterative decoding process comprises the steps: monitoring a level of a characteristic related to the iterative decoding process and providing a data signal in dependence thereupon—24; determining a scaling factor in dependence upon the data signal—26; and scaling the encoded samples using the scaling factor—28.

The level of the characteristic is monitored, for example, once at a predetermined number of iteration steps or a predetermined time instance. Alternatively, the level of the characteristic is monitored a plurality of times at predetermined numbers of iteration steps or predetermined time instances.

The scaling factor is determined, for example, once at a predetermined number of iteration steps or a predetermined time instance. Alternatively, the scaling factor is determined a plurality of times at predetermined numbers of iteration steps or predetermined time instances. This allows adapting of the scaling factor to the progress of the iterative process. For example, the scaling factor is gradually increased or decreased during the decoding process in order to accelerate convergence.

The level of the characteristic is, for example, related to: a number of iteration steps—for example, a number of decoding cycles; a dynamic power consumption—for example, the scaling factor is changed if the dynamic power consumption does not substantially decrease (indicating convergence); or a switching activity—for example, the scaling factor is changed if the switching activity does not substantially decrease (indicating convergence). For embodiments in which the level of the characteristic is related to the switching activity, the switching activity is optionally sensed at predetermined logic components of the decoder to determine whether it is increasing, decreasing, or remaining constant or similar.

In an embodiment, corresponding scaling factors are determined for a plurality of levels of the characteristic and the same are stored memory. The scaling factor—at 26—is then determined by retrieving from the memory a corresponding scaling factor in dependence upon the received data signal. The scaling factors are determined, for example, as described above, in a simulated or empirical fashion and memory having stored therein data indicative of the corresponding scaling factors is disposed in the scaling system of a specific type of decoder.

Alternatively, corresponding scaling factors are determined for a plurality of levels of the characteristic and a relationship between the levels of the characteristic and the scaling factor is then determined in dependence thereupon. The scaling factor—at 26—is then determined in dependence upon the received data signal and the relationship. For example, the determination of the scaling factor using the relationship is implemented in a hardware fashion.

Figure 3:
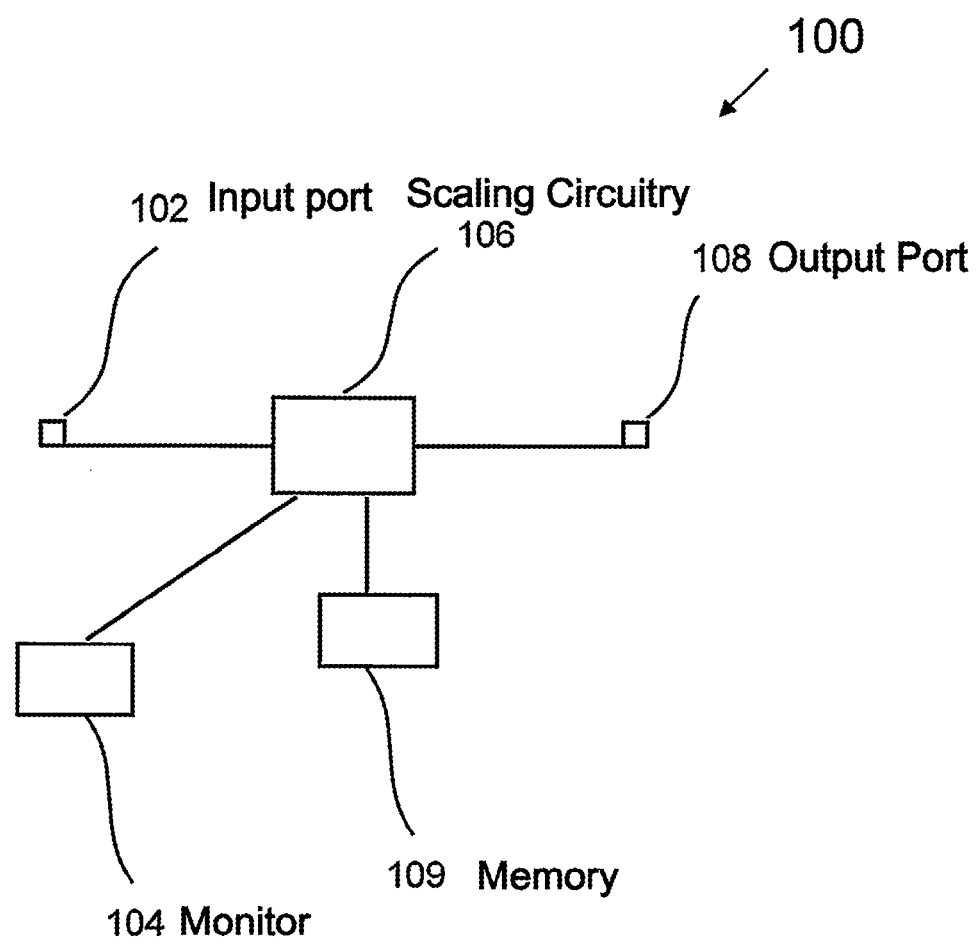
FIG. 3 is a simplified block diagram illustrating a scaling system according to an embodiment of the invention.

Referring to FIG. 3, a simplified block diagram of a scaling system 100 according to an embodiment of the invention is shown. The scaling system 100 enables implementation of the embodiments described above with reference to FIGS. 1 and 2. The scaling system 100 comprises an input port 102 for receiving a set of encoded samples. The set of encoded samples is for being decoded using an iterative decoding process. A monitor 104 monitors one of a noise level of a transmission channel used for transmitting the encoded samples and a level of a characteristic related to the iterative decoding process and provides a data signal in dependence thereupon. The monitor 104 is, for example, coupled to the transmission channel for monitoring the noise level of the same. Alternatively, the monitor 104 is coupled to: a power supply of the decoder for monitoring dynamic power consumption, logic circuitry of the decoder for monitoring a number of iteration steps or switching activity. Scaling circuitry 106 is connected to the input port 102 and the monitor 104. The scaling circuitry 106 determines a scaling factor in dependence upon the data signal and scaled encoded samples by scaling the encoded samples using the scaling factor. Output port 109 connected to the scaling circuitry 106 provides the scaled encoded samples to the decoder. Optionally, the system 100 comprises memory 108 connected to the scaling circuitry 106. The memory 108 has stored therein a plurality of scaling factors corresponding to a plurality of levels of the one of a noise level of a transmission channel used for transmitting the encoded samples and a level of a characteristic related to the iterative decoding process.

The above embodiments of the scaling method and system are applicable, for example, in combination with stochastic decoders and numerous other iterative decoders such as sum-product and min-sum decoders for improving BER decoding performance and/or convergence behavior.

Furthermore, the above embodiments of the scaling method and system are also applicable to various iterative signal processes other than decoding processes.

The above embodiments of the scaling method and system are applicable for different types of transmission channels other than AWGN channels, for example, for fading channels.

A major difficulty observed in stochastic decoding is the sensitivity to the level of switching activity—bit transition—for proper decoding operation, i.e. switching events become too rare and a group of nodes become locked into one state. To overcome this "latching" problem, Edge Memories (EMs) and Internal Memories (IMs) have been implemented to re-randomize and/or de-correlate the stochastic signal data streams as disclosed, for example, in US Patent Application 20080077839 and U.S. patent application Ser. No. 12/153,749 (not yet published).

EMs are memories assigned to edges in a factor graph for breaking correlations between stochastic signal data streams using re-randomization to prevent latching of respective Variable Nodes (VNs). Stochastic bits generated by a VN are categorized into two groups: regenerative bits and conservative bits. Conservative bits are output bits of the VN which are produced while the VN is in a hold state and regenerative bits are output bits of the VN which are produced while the VN is in a state other than the hold state. The EMs are only updated with regenerative bits. When a VN is in a state other than the hold state, the newly produced regenerative bit is used as the outgoing bit of the edge and the EM is updated with this new regenerative bit. When the VN is in the hold state for an edge, a bit is randomly or pseudo randomly chosen from bits stored in the corresponding EM and is used as the outgoing bit. This process breaks the correlation of the stochastic signal data streams by re-randomizing the stochastic bits and, furthermore, reduces the correlation caused by the hold state in a stochastic signal data stream. This reduction in correlation occurs because the previously produced regenerative bits, from which the outgoing bits are chosen while the VN is in the hold state, were produced while the VN was not in the hold state.

In order to facilitate the convergence of the decoding process, the EMs have a time decaying reliance on the previously produced regenerative bits and, therefore, only rely on most recently produced regenerative bits.

Different implementations for the EMs are utilized. One implementation is, for example, the use of an M-bit shift register with a single selectable bit. The shift register is updated with regenerative bits and in the case of the hold state a bit is randomly or pseudo randomly chosen from the regenerative bits stored in the shift register using a randomly or pseudo randomly generated address. The length of the shift register M enables the time decaying reliance process of the EM. Another implementation of EMs is to transform the regenerative bits into the probability domain using up/down counters and then to regenerate the new stochastic bits based on the measured probability by the counter. The time decaying processes are implemented using saturation limits and feedback.

Figure 4:
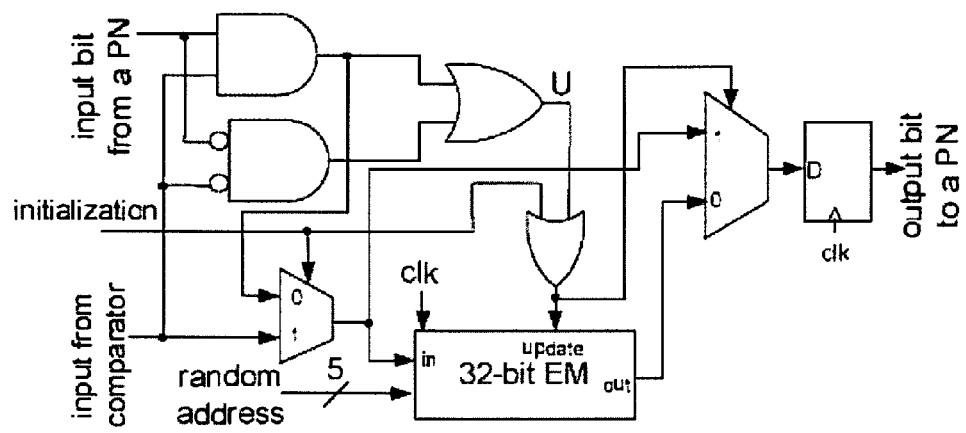
FIG. 4 is a simplified block diagram of a VN with an EM.

Referring to FIG. 4, a simplified block diagram of an architecture of a degree-3 VN with an EM having a length of M=32 is shown. The EM is implemented as a shift register with a single selectable bit using shift register look-up tables available, for example, in Xilinx Virtex architectures.

A VN as shown has two modes of operation: an initialization mode and a decoding mode. Prior to the decoding operation and when the channel probabilities are loaded into the decoder, the VNs start to initialize the respective EMs in dependence upon the received probability. Although it is possible to start the EMs from zero, the initialization of the EMs improves the convergence behavior and/or the BER performance of the decoding process. To reduce hardware complexity, the EMs are initialized, for example, in a bit-serial fashion. During the initialization, an output port of the comparator of the VN is connected to the respective EMs of the VN and the EMs are updated. Therefore, the initialization uses M Decoding Cycles (DCs) where M is the maximum length of the EMs. At low BERs, where convergence of the decoding process is fast, consuming M DCs for initialization substantially limits the throughput of the decoder.

In the decoding mode, the VN, as illustrated in FIG. 4, uses a signal U to determine if the VN is in the hold state—U=0—or in a state other than the hold state—U=1. When the VN is in a state other than the hold state, the new regenerative bit is used as the output bit and also to update the EM. In the hold state, a bit is randomly or pseudo randomly chosen from the EM using random or pseudo random addresses, which vary with each DC.

In a method for partially initializing EMs according to embodiments of the invention, the EMs are initialized to X bits, where X<M. For example, the EM of the VN illustrated in FIG. 4 is partially initialized to 16 bits. During this partial initialization, the EM is, for example, bit-serially updated with the output bits of the VN comparator for 16 DCs. After the EMs are partially initialized and the decoding operation begins, the Randomization Engine (RE) generates addresses in the range of [0, X−1], instead of [0, M−1], for T DCs. Due to the partial initialization at the beginning of the decoder operation, the range of random or pseudo random addresses is, for example, limited to 4 bits—i.e. 0 to 15—for 40 DCs. This process ensures that during the hold state, a valid output bit is retrieved from the EM. After this phase—for example, 40 DCs—the EM is updated and the RE generates addresses corresponding to the full range of the EM [0, M−1]. Values for T and X are, for example, determined by simulating the BER performance and/or the convergence behaviour of the decoding process. Alternatively, the values for T and X are determined in an empirical fashion. The method for partially initializing EMs reduces the number of DCs used for the initialization while enabling similar BER performance and/or convergence behavior to the full initialization, thus an increased throughput is obtained.

Optionally, the EM is updated in a fashion other than bit-serial, for example, 2 bits by 2 bits or in general K bits by K bits. Further optionally, the bits stored in a portion of the EM are copied to another portion of the EM using, for example, standard information duplication techniques. For example, during partial initialization half of the EM storage is filled with bits generated which are then copied to the remaining half of the EM storage, thus the reduction of addresses generated by the RE is obviated.

Figure 5:
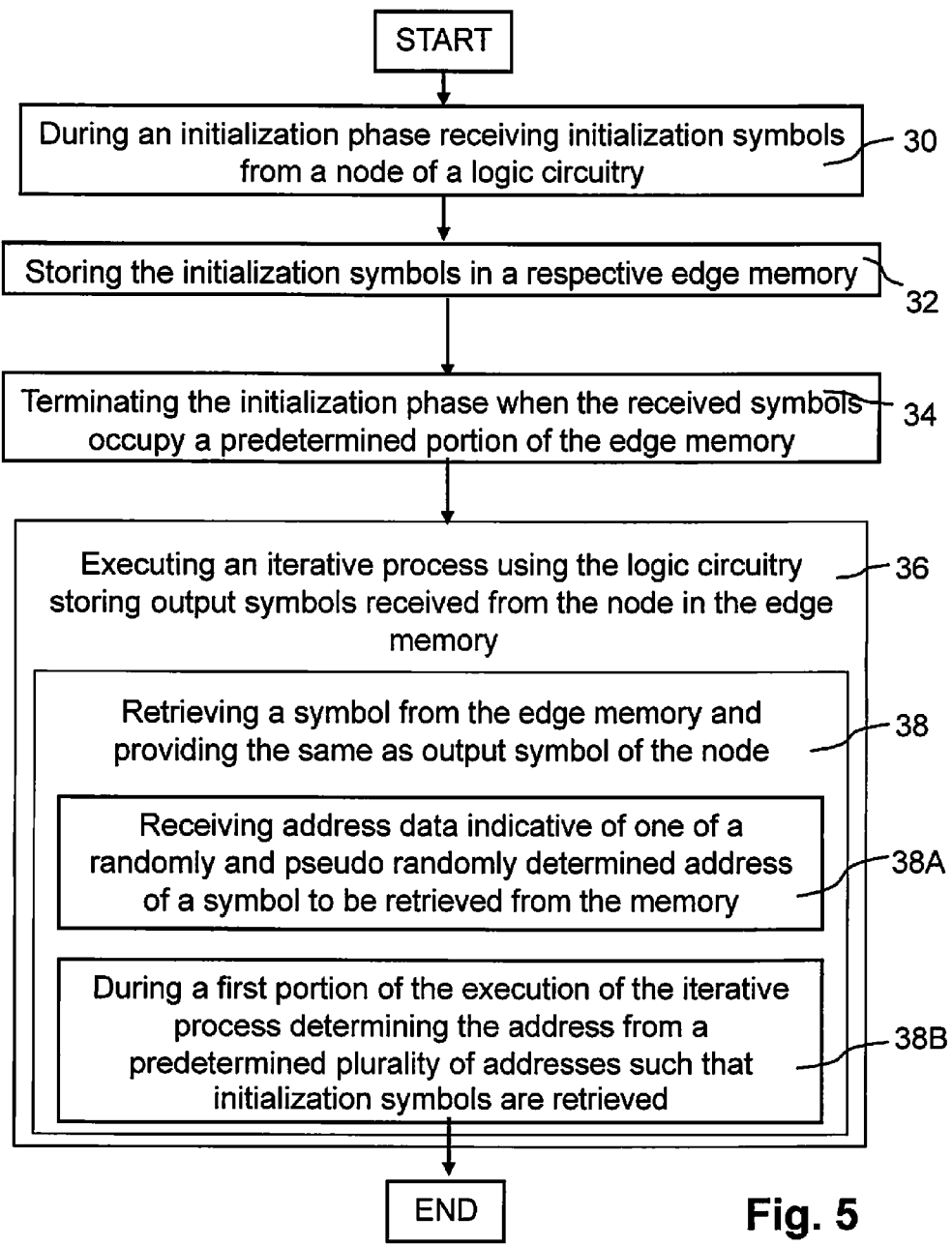
FIG. 5 is a simplified flow diagram of a method for initializing edge memory according to an embodiment of the invention.

Referring to FIG. 5, a simplified flow diagram of a method for initializing edge memory according to an embodiment of the invention is shown. During an initialization phase initialization symbols are received—30—from a node of a logic circuitry such as, for example, a VN of an iterative decoder. The initialization symbols are then stored in a respective edge memory—32. The initialization phase is terminated when the received symbols occupy a predetermined portion of the edge memory—34. An iterative process is then executed using the logic circuitry and output symbols received from the node are stored in the edge memory—36. During the execution of the iterative process a symbol is retrieved from the edge memory, for example, when a respective VN is in the hold state, and provided as output symbol of the node—38. At 38A, address data indicative of one of a randomly and pseudo randomly determined address of a symbol to be retrieved from the memory are received. During a first portion of the execution of the iterative process the address is determined from a predetermined plurality of addresses such that initialization symbols are retrieved—38B.

Figure 6A:
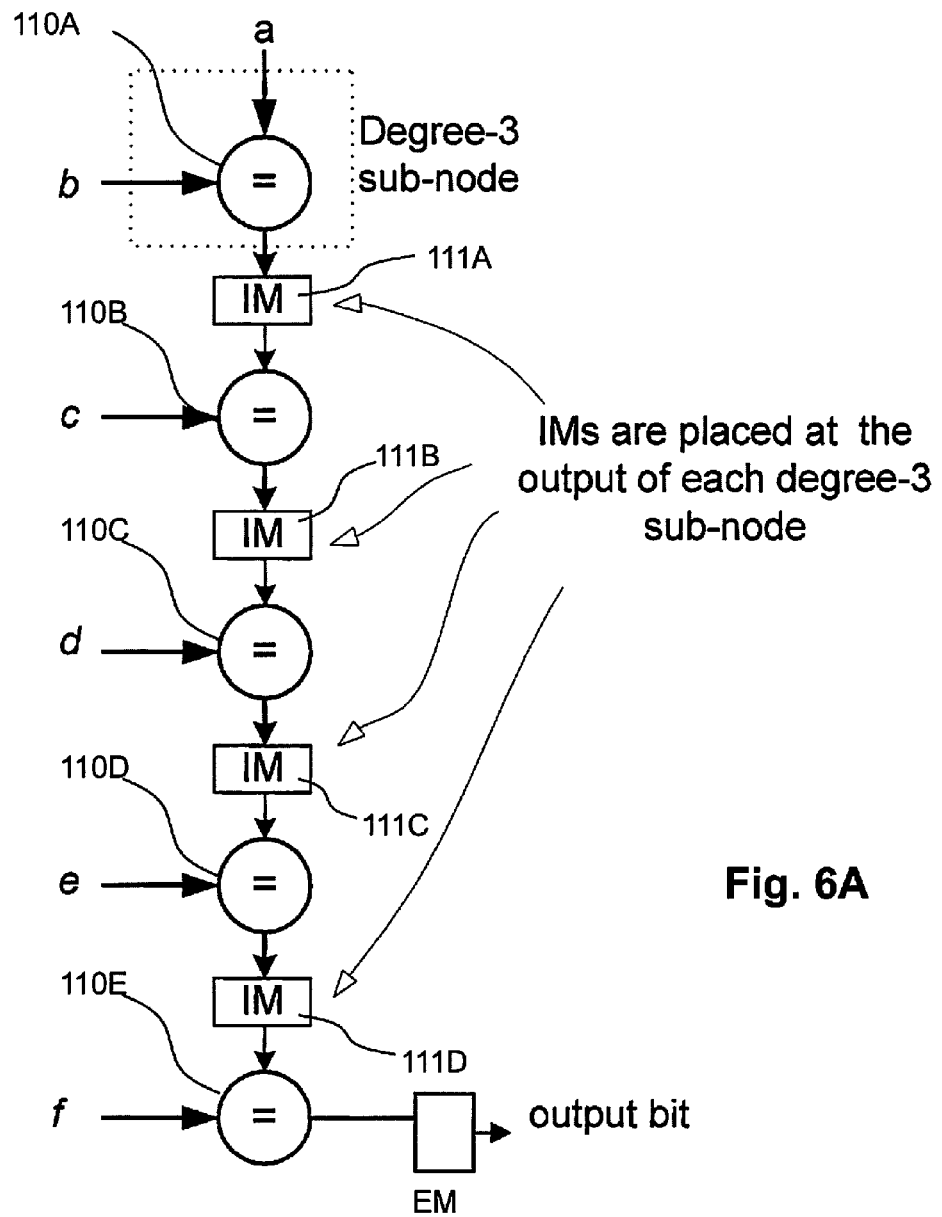
FIGS. 6a and 6b are simplified block diagrams of a 7-degree VN.
Figure 6B:
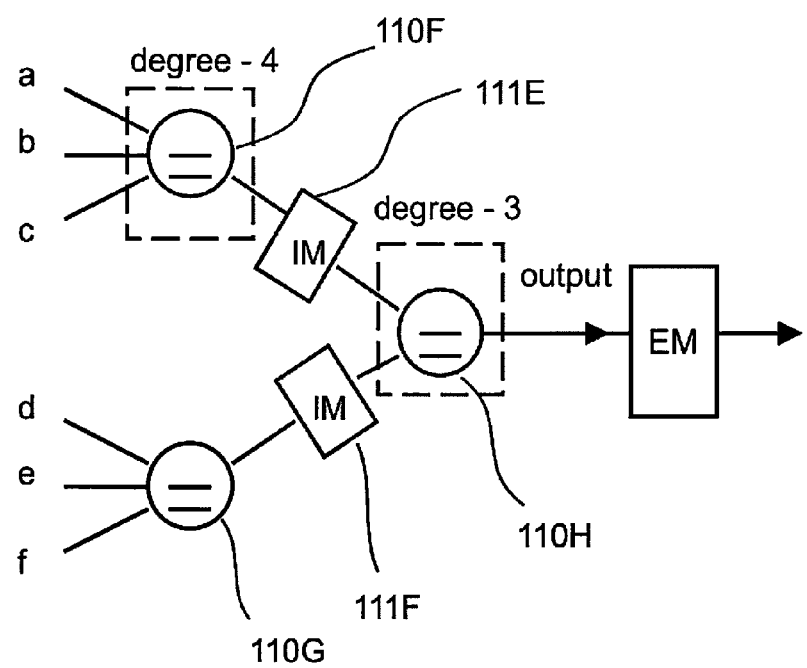

High-degree VNs are partitioned into a plurality of lower-degree variable "sub-nodes"—for example, degree-3 or degree-4 sub-nodes—with each lower-degree sub-node having an Internal Memory (IM) placed at its output port when the same is connected to an input port of a following sub-node. Referring to FIGS. 6A and 6B, simplified block diagrams of a 7-degree VN 110 are shown. There are different architectures realizable for partitioning a high-degree VN. For example, the 7-degree VN is partitioned into 5 degree-3 sub-nodes 110A to 110E, shown in FIG. 6A, or into 2 degree-4 and one degree-3 sub-nodes 110F to 110H, shown in FIG. 6B. Accordingly, 4 IMs 111A to 111D are placed at a respective output port of the first four degree-3 sub-nodes 110A to 110D in FIG. 6A, and 2 IMs 111E and 111F are placed at a respective output port of the first two degree-4 sub-nodes 110F and 110G in FIG. 6B. The operation of the IMs is similar to the one of the EMs. The difference is that the EM is placed at the output edge connected to a VN and is used to provide an output bit for the entire VN, while the IM is used to provide an output bit for only a sub-node within the VN.

The operation of a sub-node is then as follows:
1) When all input bits of the sub-node are equal, the sub-node is in the regular state, using the equality operation on the input bits to calculate the output bit. The IM is updated with the new output bit, for example, in a FIFO fashion.
2) When the input bits are not equal, the equality sub-node is in the hold state. In this case a bit is randomly or pseudo-randomly selected from the previous output bits stored in the IM and provided as the new output bit. The IM is not updated in the hold state.

In a high-degree VN a plurality of IMs are used to determine an output bit for each edge of the VN. For example, a degree-5 VN has 5 output ports corresponding to 5 edges and if this node is partitioned into degree-2 sub-nodes, 2 IMs are used per each output port, i.e. a total of 10 IMs. As the degree of the VN increases the number of IMs also increases.

Figure 7:
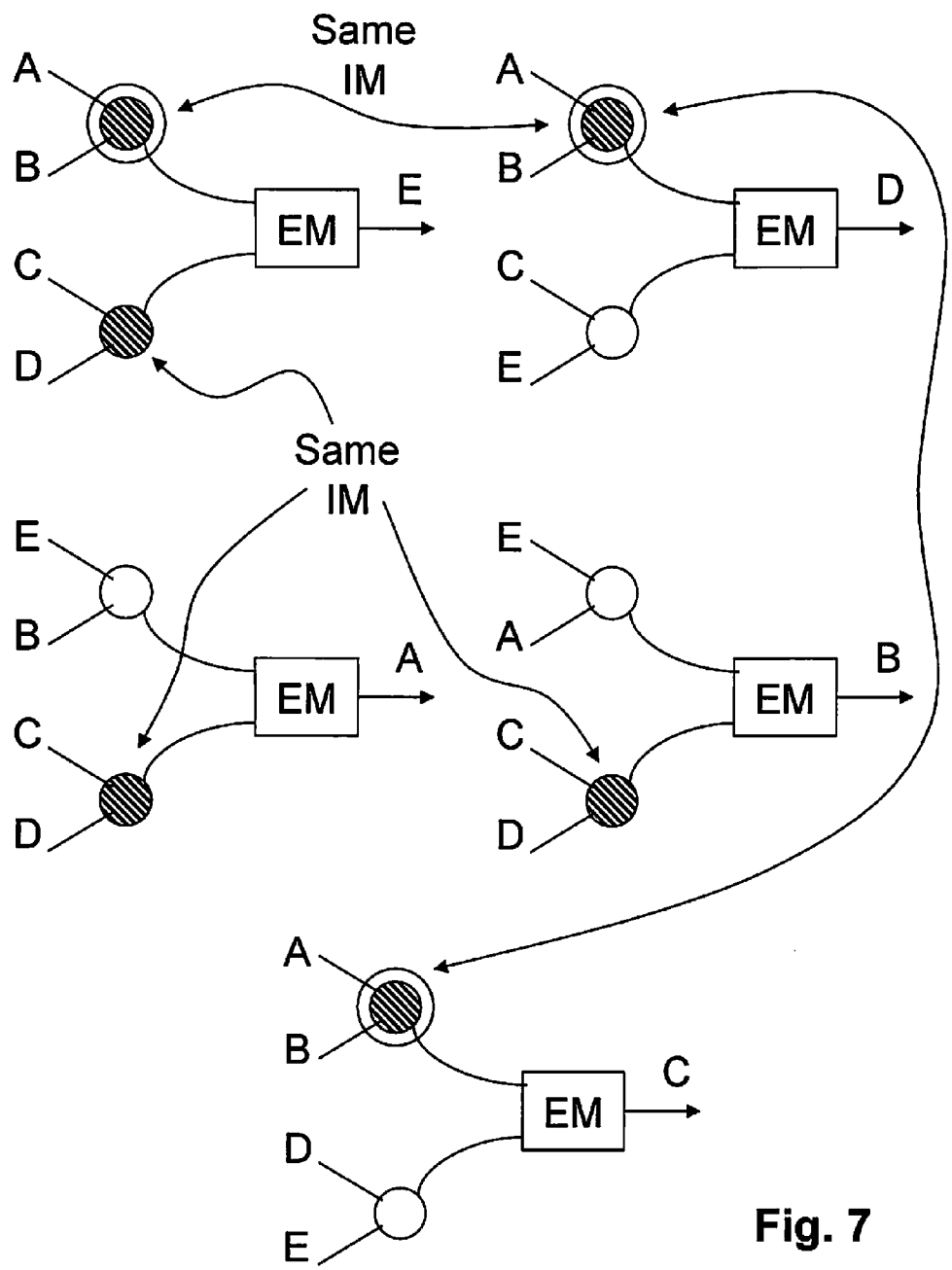
FIG. 7 is a simplified block diagram of a high degree VN according to an embodiment of the invention.

Referring to FIG. 7, a simplified block diagram of a high degree VN according to an embodiment of the invention is shown. FIG. 7 illustrates in an exemplary implementation a degree-5 VN partitioned into degree-2 sub-nodes. Here, sub-nodes receiving same input signal data share a same IM—indicated by shaded circles in FIG. 7. For example, up to 3 sub-nodes share a same IM in the architecture illustrated in FIG. 7. As a result, instead of 10 IMs only 6 IMs are employed for realizing the degree-5 node.

Figure 8:
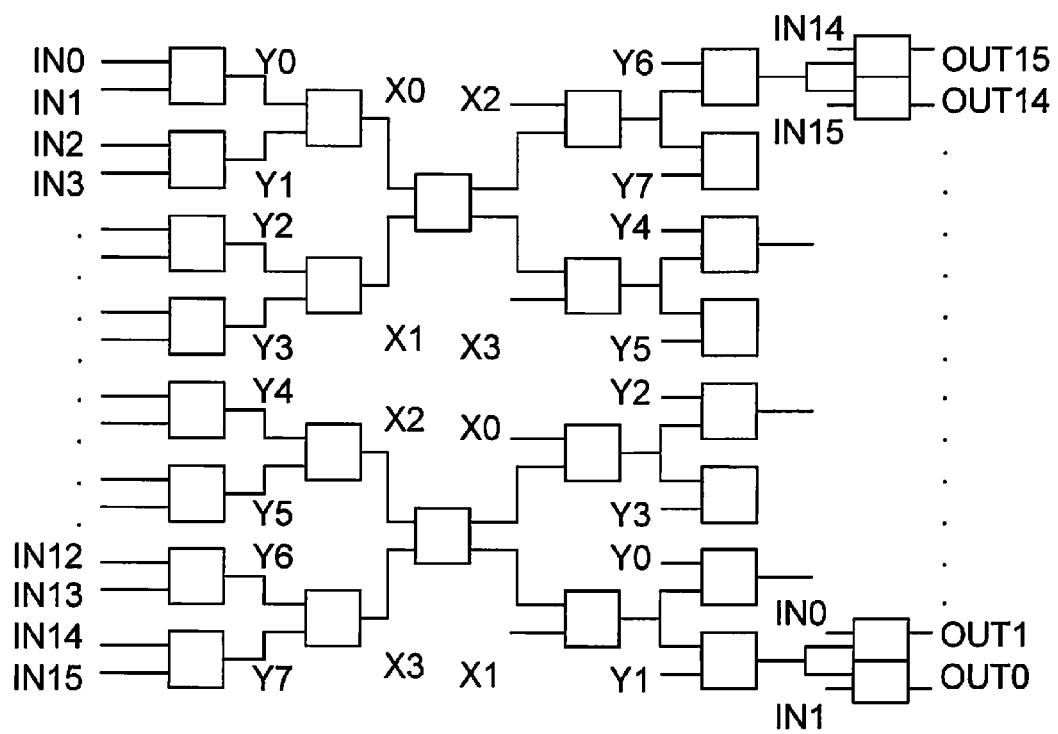
FIG. 8 is a simplified block diagram for a very high degree VN according to an embodiment of the invention.

Referring to FIG. 8, a simplified block diagram for a very high degree VN according to an embodiment of the invention is shown. FIG. 8 illustrates an efficient degree-16 VN, although arbitrary degrees can be implemented similarly. Here, the architecture is based sharing sub-nodes effectively within a binary-tree structure with sub-nodes receiving same input signal data sharing a same IM. Accordingly this structure of high degree stochastic VNs is implementable with $(3d_v-6)$ sub-nodes. Hence for $d_v=16$ in FIG. 8 this results in 42 sub-nodes. Hence when designing the architecture of a high degree VN, the VN is partitioned such that an architecture is determined in order to realize a maximum number of shared IMs in the VN.

While embodiments of the method and system for re-randomizing and/or de-correlating the stochastic signal data streams are described hereinbelow for stochastic decoding of, for example, various classes of error-correcting codes such as binary LDPC codes, non-binary LDPC codes, RS codes, BCH codes, and Turbo codes, for simplicity, it will become evident to those skilled in the art that the embodiments of the method and system for re-randomizing and/or de-correlating the stochastic signal streams are not limited thereto, but are also applicable for re-randomizing and/or de-correlating the stochastic signal data streams in various other stochastic signal processing methods.

In the description herein below mathematical terms are used for clarity, but as is evident to one skilled in the art these terms are not to be considered as being strictly absolute, but to also include degrees of approximation depending, for example, on the application or technology.

For simplicity, the embodiments of the method and system for re-randomizing and/or de-correlating the stochastic signal data streams are described using a bitwise representation of the stochastic signal data streams, but it will be apparent to those skilled in the art that they are also implementable using a symbol-wise representation, for example, symbols comprising a plurality of bits or non-binary symbols.

The method and system for re-randomizing the stochastic signal data streams according to embodiments of the invention described herein below is based on the following recursive equation:

$$P(t+1)=P(t)-\beta(t)P(t)+\beta(t)b(t), \qquad (1)$$

where P(t) is a present probability of the stochastic signal data stream, for example, a variable node's output signal data stream, with $0 \leq P(t) \leq 1$; P(t+1) is a following probability of the stochastic signal data stream; b(t) is an input symbol of the stochastic signal data stream, for example, the variable node's output bit '0' or '1', at time t; and β(t) is a scaling coefficient at time t.

The value of the scaling coefficient β(t) for achieving substantially optimum performance also depends on the Signal-to-Noise-Ratio (SNR)—i.e. the noise level—of the transmission channel for a same type of code. This implies that, for example, for a first SNR, $SNR_1$, the decoder achieves optimum performance with $\beta(t)_1$, and that at a second SNR, $SNR_2$, the decoder achieves optimum performance with $\beta(t)_2$.

According to embodiments of the invention described herein, the scaling coefficient β(t) is optionally a fixed value or other than a fixed value. Optionally it is varied in dependence upon the value of the SNR. In an embodiment according to the invention, a plurality of scaling coefficients β(t) corresponding to respective SNRs—SNR points or SNR ranges—are determined such that a predetermined performance—BER; convergence; switching activity—of the decoder is optimized. The determined scaling coefficients and the corresponding SNR values are then stored in a memory of a scaling system of the decoder. The scaling system of the decoder than determines the SNR of the transmission channel and according to the determined SNR retrieves the corresponding scaling coefficient from the memory. The scaling coefficients are determined, for example, by simulating the predetermined performance of the decoder or, alternatively, in an empirical fashion.

Alternatively, the plurality of scaling coefficients corresponding to respective SNRs—SNR points or SNR ranges—are determined and in dependence thereupon a relationship between the scaling coefficients and the SNRs is determined. The scaling system of the decoder then determines the SNR of the transmission channel and according to the determined SNR determines the scaling coefficient using the relationship.

Optionally the scaling coefficient is employed or changed during execution of the iterative decoding process. For example, a scaling coefficient is first determined based on the noise level of the transmission channel, as described above, and then changed during the iterative decoding process. Alternatively, the scaling coefficient is determined independent from the noise level of the transmission channel during execution of the iterative decoding process.

At predetermined time instances, for example, every decoding cycle during execution of a stochastic decoding process, $P(t+1)$ is compared with one of a pseudo random number and a random number, $R(t)$. If $P(t+1) > R(t)$ or $P(t+1) \geq R(t)$ then an output bit of the system for re-randomizing the stochastic signal data streams is determined to be '1', i.e. the bit in the re-randomized or de-correlated stochastic signal data stream is '1'. Otherwise the output bit of the system for re-randomizing the stochastic signal data streams is determined to be '0'.

The present probability $P(t)$ is, for example, a measured probability of the stochastic signal data stream such as an output signal data stream of a variable node.

Figure 9:
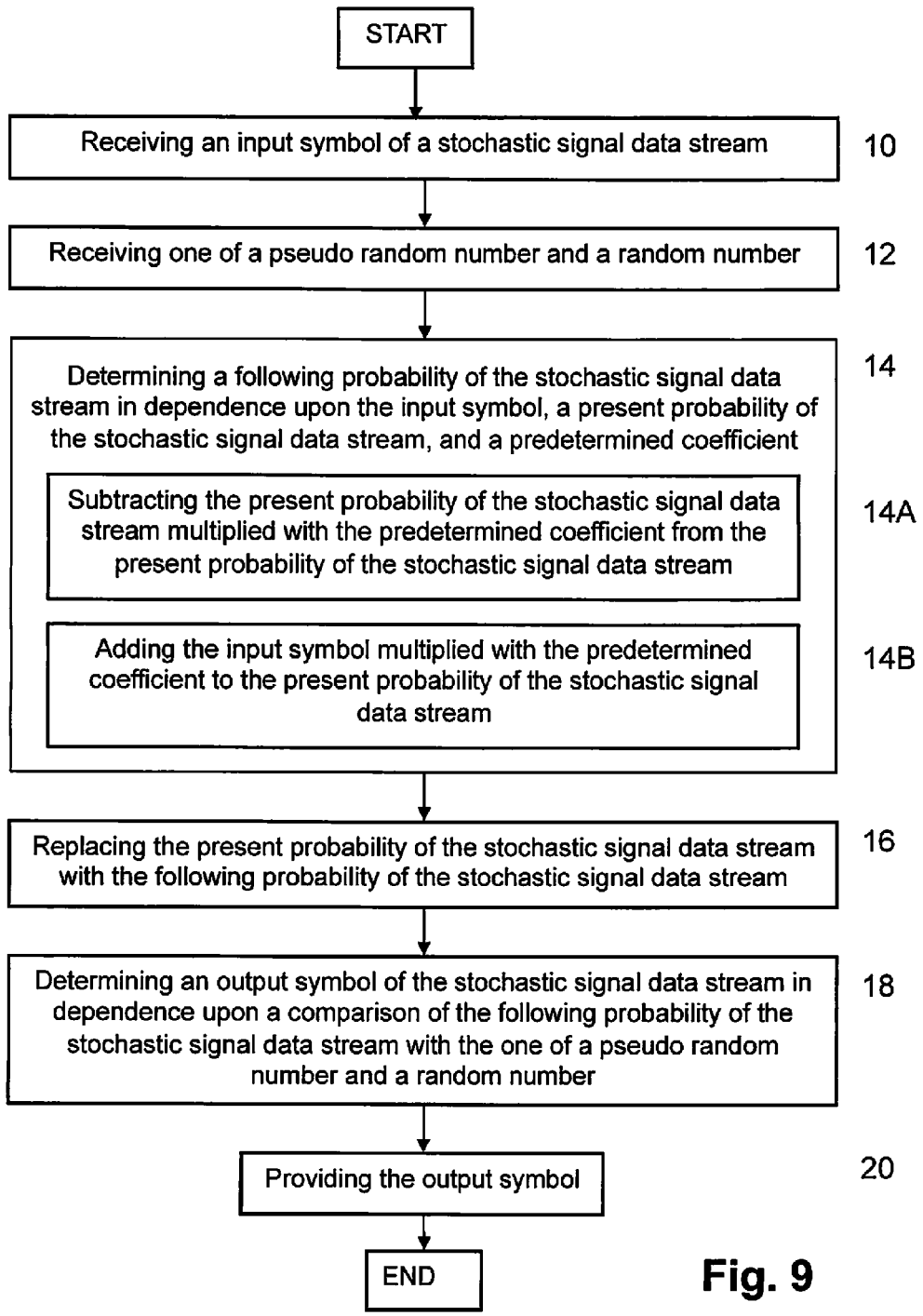
FIG. 9 is a simplified flow diagram of a method for re-randomizing or de-correlating a stochastic signal data stream according to an embodiment of the invention.

Referring to FIG. 9, a simplified flow diagram of a method for re-randomizing or de-correlating a stochastic signal data stream according to an embodiment of the invention is shown. At 10, an input symbol of a stochastic signal data stream—for example, a variable node's output bit '0' or '1'—is received. Furthermore, one of a pseudo random number and a random number is received—12—from, for example, a pseudo random number generator or a random number generator. A following probability of the stochastic signal data stream is then determined—14—in dependence upon the input symbol, a present probability of the stochastic signal data stream, and a predetermined coefficient. The following probability of the stochastic signal data stream is determined, for example, by subtracting the present probability of the stochastic signal data stream multiplied with the predetermined coefficient from the present probability of the stochastic signal data stream—14a—and adding the input symbol multiplied with the predetermined coefficient to the present probability of the stochastic signal data stream—14b. The steps 14a and 14b are implementations of the recursive equation (1) as described above. The present probability of the stochastic signal data stream is then replaced with the following probability of the stochastic signal data stream—16—for calculations at further time instances such as a following iteration step. At 18, an output symbol of the stochastic signal data stream in dependence upon a comparison of the following probability of the stochastic signal data stream with the one of a pseudo random number and a random number, which is then provided—20—for further processing, for example, to a parity check node of a stochastic decoder. For example, as described above when the following probability is greater or greater equal to the one of a pseudo random number and a random number then the output bit is determined to be '1'.

Optionally, the output bit determined to be '0' or various output symbols are generated in dependence upon the comparison depending, for example, on specific applications.

Optionally, the predetermined coefficient is varied during processing of the stochastic signal data stream, for example, different predetermined coefficients are used for different decoding cycles in a stochastic decoder.

The predetermined coefficient is determined, for example, in dependence upon a performance of a process processing the stochastic signal data stream such as, for example, a bit error ratio performance or convergence of the process. Alternatively, the predetermined coefficient is determined in dependence upon an operating signal to noise ratio of a received data signal.

In one implementation the predetermined coefficient is a fixed value during processing of the stochastic signal data stream with the fixed value being a negative power of two. Using the fixed value of a negative power of two enables performing the multiplication of the present probability of the stochastic signal data stream with the predetermined coefficient—step 14a—by shifting the value of the present probability of the stochastic signal data stream, accordingly.

Optionally, the following probability of the stochastic signal data stream is determined in a different fashion than according to the equation (1) depending on, for example, a specific application. Further optionally, the predetermined coefficient is omitted, for example, set to be equal to one in the equation (1).

Figure 10A:
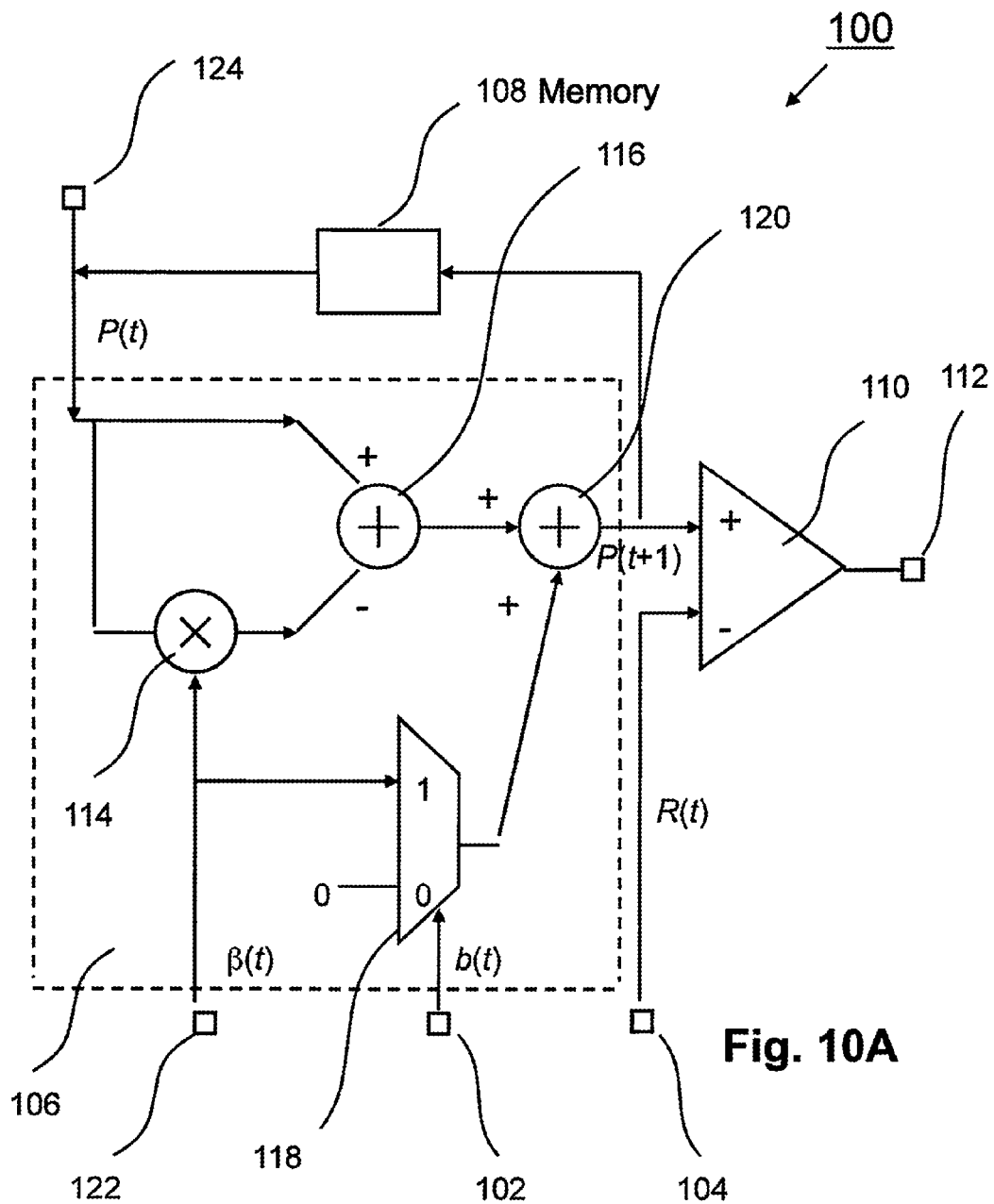
FIGS. 10a and 10b are simplified block diagrams of a system for re-randomizing or de-correlating a stochastic signal data stream according to embodiments of the invention.

Referring to FIG. 18a, a simplified block diagram of a system 100 for re-randomizing or de-correlating a stochastic signal data stream according to an embodiment of the invention is shown. The system 100 comprises an input port 102 for being connected, for example, to an output port of a variable node of a stochastic decoder, for receiving an input symbol of a stochastic signal data stream. An input port 104 is for being connected to, for example, one of a pseudo-random number generator and a random number generator, for receiving one of a pseudo random number and a random number $R(t)$. Probability circuitry 106, indicated by dashed lines, is connected to the input port 102 and determines a following probability $P(t+1)$ of the stochastic signal data stream in dependence upon at least the input symbol and a present probability $P(t)$ of the stochastic signal data stream. Memory 108 is connected to the probability circuitry 106 such that the present probability $P(t)$ of the stochastic signal data stream is provided to the probability circuitry 106 and the following probability $P(t+1)$ of the stochastic signal data stream is provided to the memory 108. Comparison circuitry 110—for example, a comparator as illustrated in FIG. 10a—is connected to the probability circuitry 106 and the input port 104. The comparison circuitry 110 determines an output symbol of the stochastic signal data stream in dependence upon a comparison of the following probability $P(t+1)$ of the stochastic signal data stream with the one of a pseudo random number and a random number $R(t)$. For example, as described above when the following probability $P(t+1)$ is greater or greater equal to the one of a pseudo random number and a random number $R(t)$ then the output bit is determined to be '1'. Optionally, the output bit determined to be '0' or various output symbols are generated in dependence upon the comparison depending, for example, on specific applications using more complex circuitries than the comparator illustrated in FIG. 10a. Output port 112 is for being connected, for example, to a parity check node of a stochastic decoder, for providing the output symbol.

The probability circuitry 106 comprises probability multiplication circuitry 114 such as, for example, a multiplier, for multiplying the present probability P(t) of the stochastic signal data stream with a predetermined coefficient β(t) and a subtractor 116 for subtracting the multiplication result from the present probability P(t) of the stochastic signal data stream. The probability circuitry 106 further comprises input symbol multiplication circuitry 118 such as, for example, a multiplexer, for multiplying the input symbol b(t) with the predetermined coefficient) β(t) and an adder 120 connected to the subtractor 116.

The predetermined coefficient β(t) is provided via input port 122, which is, for example, connected to a control circuitry. As illustrated in FIG. 10a, the input port 122 is connected to the multiplier 114 and the multiplexer 118 for providing the predetermined coefficient β(t) thereto. Input port 124 is connected to the probability circuitry 106 for providing, for example, a measured present probability P(t) of the stochastic signal data stream thereto. The measured present probability P(t) of the stochastic signal data stream is provided, for example, at an initial state of an iteration process when there is no data indicative of a present probability P(t) is stored in the memory 108.

Figure 10B:
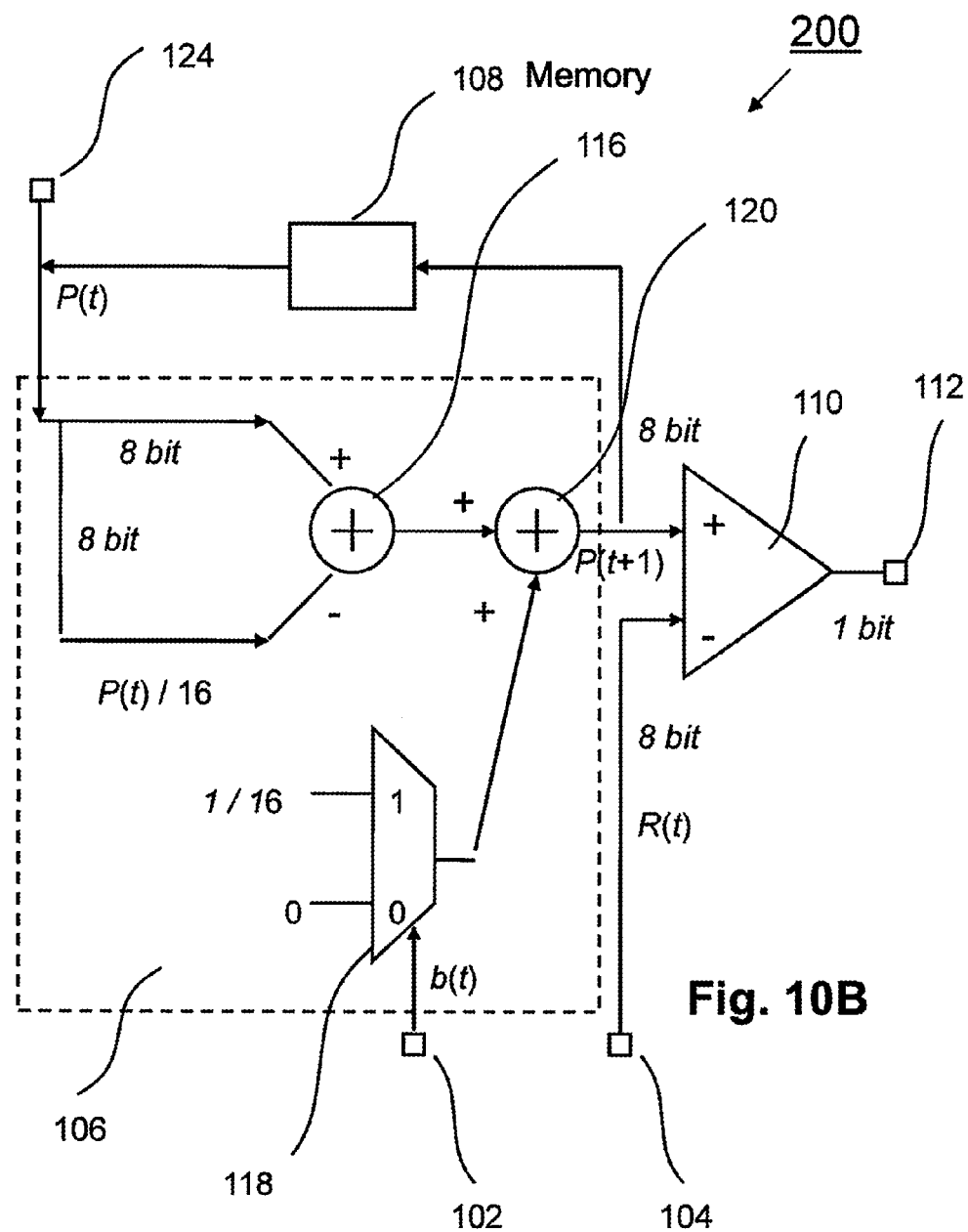
Figure 10C:
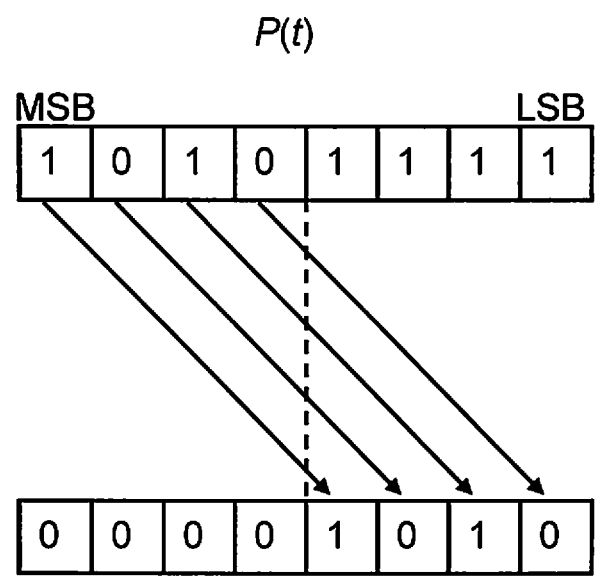
FIG. 10c is a diagram illustrating determination of the product $\beta(t) P(t)$ by applying a 4-bit shift to $P(t)$ used in the embodiment illustrated in FIG. 18b.

Referring to FIG. 10b, a simplified block diagram of a system 200 for re-randomizing or de-correlating a stochastic signal data stream according to an embodiment of the invention is shown. Same reference numerals as in FIG. 10a are used for referring to same components. Here, the predetermined coefficient β(t) is a fixed value of a negative power of two, i.e. $½^4=1/16$, and the product β(t) P(t) is calculated by applying a 4-bit shift to the present probability P(t), as illustrated in FIGS. 10b and 10c.

The system for re-randomizing or de-correlating a stochastic signal data stream according to embodiments of the invention is implementable using standard semiconductor technology and uses substantially less area on semiconductor chips such as, for example, ASICs than the implementation of EMs and IMs.

The input symbol b(t) is, for example, a regenerative bit received from a variable node of a stochastic decoder. Optionally, both regenerative bits as well as non-regenerative bits are used as input symbol b(t).

When implemented in a stochastic decoder, the output bit of the system for re-randomizing or de-correlating a stochastic signal data stream according to an embodiment of the invention is used, for example, only when a corresponding variable node is in a hold state. In states other than a hold state a current regenerative bit produced by the variable node is used as the output bit of the variable node.

A TFM extracts the moving average probability of a stochastic stream based on a method of successive relaxation. When r(t) is the regenerative bit from a VN and P(t) is the probability extracted by the TFM at time t for the corresponding stochastic stream (0<=P(t)<=1). The TFM updates P(t) in non hold states as follows:

$$P(t+1)=P(t)+β(t)(r(t)-P(t)) \quad (1)$$

Where β(t) is the relaxation coefficient and usually 0<β(t)<1. When the VN is in the hold state, P(t) is compared against one of a pseudo random number and a random number, R(t), to generate r'(t), where r'(t) is a 1 when P(t) is greater than R(t) and is 0 otherwise.

The TFM update criterion provides an exponential time-decaying dependence on input bits. The equation is further simplified when β(t) is a constant (let's call it β. FIG. 11(a) and FIG. 11(b) depict the dependence of P(t+1) on previous input bits in a TFM with $β(t)2^{-5}$ and an EM with a length of M=32 bits, respectively. As shown, the dependence in the TFM exponentially decreases over time, but the dependence in EM is equal to 1/M for the last M input bits and is zero for the prior input bits. FIG. 11(c) shows the dependence in a bit-serial TFM described below.

Figure 12:
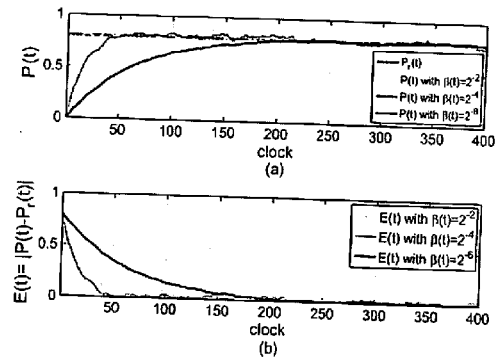
FIG. 12a is a graph of convergence speed of a TFM for different values of $\beta(t)$.
FIG. 12b is a graph of corresponding estimation error of a TFM for different values of $\beta(t)$.

The strong dependence on recent input regenerative bits and gradual forgetting of older input bits enable TFMs to track changes. The value of β(t) determines the speed and the accuracy of the convergence/re-sponse of TFMs. FIG. 12(a) shows a convergence of a TFM for different values of β(t). The input stream of the TFM is generated based on input stream probability of $P_r(t)=0.8$ and the TFM is initialized to P(0)=0 for each case. As shown, as the value of β(t) decreases, TFM converges more conservatively toward $P_r(t)$, but after convergence, P approximates Pr(t) more accurately and with less fluctuations. This can be also seen in FIG. 12(b) where the TFM estimation error, $$E(t)=|P(t)-P_r(t)|, \text{ is depicted.}$$

Figure 13:
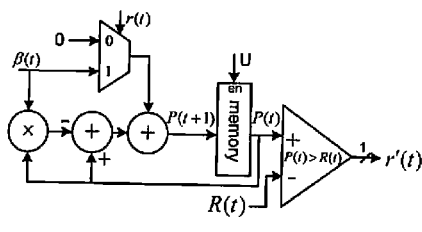
FIG. 13 is a simplified block diagram of the general architecture of a TFM.

FIG. 13 shows a general architecture of a TFM. In this architecture, it is assumed that β(t) can vary over time. Signal U in the figure determines if the VN is in hold state U=0 or if it is in a nonhold state U=1 and hence r(t) is regenerative. When U=1, P(t) is updated and VN directly uses r(t) as the output bit. When U=0, P(t) does not change and the VN uses r'(t) as the output bit. This architecture requires the use of one multiplier, two adders, one comparator and one register.

The complexity of a TFM is significantly reduced when β is chosen as a negative power of 2. In this case, the multiplication involved in TFM operation is replaceable by shifting bit wires of P(t). Further, when P(t) is represented as an unsigned integer, 1−P(t) is equal to its compliment allowing the two adders of FIG. 13 to be replaced by one adder subtractor unit.

Figure 14:
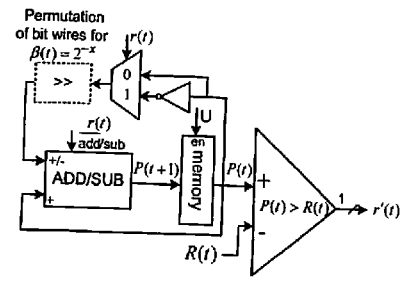
FIG. 14 is a simplified block diagram of the architecture of a reduced complexity TFM.

FIG. 14 shows the proposed reduced complexity architecture for a TFM. Compared to the general architecture, this architecture does not use any multiplier and uses one adder fewer. In simulations, the decoder is able to provide similar decoding performance when reduced in complexity as the general architecture.

Figure 11:
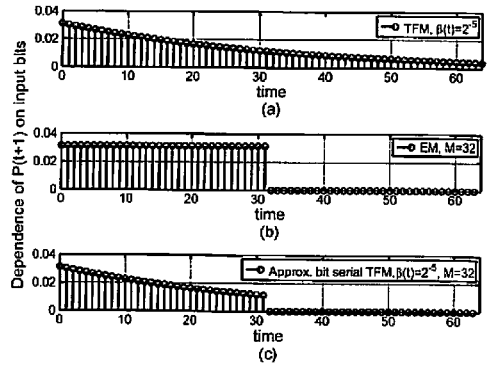
FIG. 11a is a graph of the dependence of $P(t+1)$ on previous input bits in a TFM with $\beta(t)=2^{-5}$.
FIG. 11b is a graph of the dependence of $P(t+1)$ on previous input bits, an EM with a length of M=32 bits.
FIG. 11c is a graph of the dependence of $P(t+1)$ in a bit-serial TFM.
Figure 15:
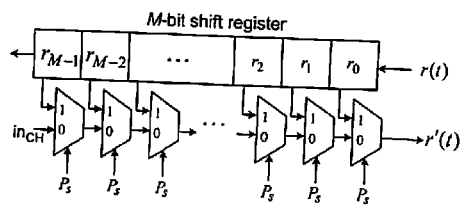
FIG. 15 is a simplified block diagram of the architecture of an approximate bit-serial TFM.

As it was shown in FIG. 11, a TFM provides an exponential time-decaying dependence on the past input regenerative bits. In approximate bit-serial TFMs, the TFM operation is approximated using only the last M regenerative input bits. FIG. 11(c) depicts the dependence on previous input bits in an approximate bit-serial TFM and it can be seen that for the last M bits the dependence is the same as a TFM while for the prior input bits the dependence is zero. FIG. 15 depicts a proposed architecture for bit-serial approximate TFM. In this architecture the last regenerative bits are stored in an M-bit shift register and upon receiving a new regenerative bit a single shift operation is performed. The TFM operation is performed by series of concatenated multiplexers. The selection line of each multiplexer is an independent stochastic stream with a probability of $P_s=β$ where 0<=β, +1. This means that at each multiplexer stage, the bit in the shift register is (directly) selected with a probability of $P_s$ and the bit from the previous stage is passed through with a probability of $1-P_s$. To provide an (initial) estimation for (residual) regenerative input bits that has been neglected, the generated stochastic stream from the received channel probability can be connected as the input bit to the last multiplexer.

It should be noted that compared to the shift register used in an EM, the shift register in the bit-serial TFM is less complex, because it does not provide a single selectable output bit and hence does not require an address decoder. However, compared to EMs and non bit-serial architectures for TFMs, the random number generation for bit-serial TFMs is more complex and, depending on the length of the shift registers used, may require more physical wires.

Figure 16:
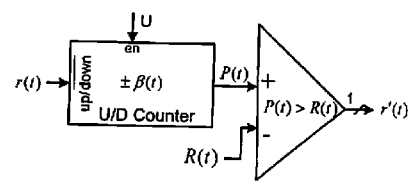
FIG. 16 is a simplified block diagram of the architecture of an approximate counter-based TFM.

Another method for approximating the TFM operation, for the sake of lower hardware complexity, is to approximate the addition/sub-traction in (1). Since the probability stored in a TFM memory is in [0, 1] interval, the TFM update rule in (1) implies that the maximum absolute change in the value of P(t) is β(t. Therefore, for the sake of lower hardware complexity, it is possible to approximate P(t+1) by an up/down counter (see FIG. 16) with a step-size equal to β(t).

Compared to EMs, TFMs are much less complex to implement; however, similar to the EM approach, in the TFM approach a stochastic VN uses one TFM per each outgoing edge. Therefore, the total number of TFMs in a stochastic decoder for a LDPC code is equal to the number of edges in the code's factor graph and even though the hardware complexity of a TFM is much less than an EM in ASIC, the total number of TFMs is still the bottleneck of the overall hardware complexity of the decoder. It is possible to, instead of assigning one TFM per outgoing edge, use only one MTFM per VN as its rerandomization unit (see FIG. 17). This significantly reduces the total number of rerandomization units used in a stochastic LDPC decoder. For example, the number of rerandomization units for the (2048,1723) decoder reduces from 12 288 to 2048. The MTFM approach significantly reduces the hardware complexity of stochastic LDPC decoders. It relies on the TFM approach, but has a different update rule based on a majority of outgoing regenerative bits in a stochastic VN.

FIG. 18 depicts a block diagram of the proposed degree-6 MTFM-based VN. The VN receives the $in_{CH}$ bit from a comparator that converts the corresponding channel probability to a stochastic stream and 6 input bits, $in_0$ to $in_5$, from the six connected PNs. The corresponding output bits are shown. The final output of the VN, is determined by the majority of bits received from connected PNs. The structure of the VN is based on the cascaded subgraphs of degree-3 and degree-2 subnodes in which each degree-3 subnode uses 2-bit internal memory. The final input stream of an MTFM is a majority of the VN's outgoing regenerative bits for all edges. Note that at a given time the VN might be in a nonhold state for some of its edges and be in the hold state for the rest of the edges. Therefore, some of the input bits of the MTFM might be regenerative and the rest are conservative bits. For this reason, each degree-2 subnode sends two bits to the MTFM. $S_i(t)$ determines if the edge is in the hold state or non hold state, and $r_i(t)$ is the output bit of the subnode which can be regenerative or conservative. The MTFM of a degree-6 VN computes the majority of $r_0(t)$ to $r_5(t)$ bits if they are regenerative. The VN operates as follows.

When the VN is in a nonhold state for edge i, it directly uses the corresponding regenerative bit as the outgoing bit of the edge.

In case that the VN is in the hold state for the edge i, it refers to the VN's MTFM and uses its output bit as the outgoing bit.

Different thresholds might be exploited for i) updating an MTFM and ii) for calculating the majority of regenerative bits in a MTFM. For example, the MTFM might be updated only when at least a certain percentage of its input bits are regenerative, and the majority criteria might be set to "50%" or "75%," etc. The choice of these parameters can affect the hardware complexity of MTFMs.

FIG. 19 shows the general architecture of MTFM for a degree-$d_v$ VN. Note that the TFM block in the figure can use any TFM architecture, for example those discussed hereinabove. The MTFM architecture shown in the figure uses $T_m$ as a majority threshold and it uses $T_u$ as a (fixed) threshold for updating the TFM. The MTFM calculates which determines the number of input bits that are regenerative and how many of these regenerative bits are equal to 1. The comparator in this architecture applies the majority criterion according to the majority threshold. In this respect, $T_m$ is usually set to a central value which implies that the output bit of the comparator is equal to 1 when more than half of the regenerative bits at time are 1, and it is equal to 0, otherwise. The TFM is only updated when U=1. In general, $T_u$ is a fixed integer whose value can be chosen based on the decoding performance of the decoder for different $T_u$. As shown in FIG. 18, the MTFM-based VN uses the output bit of the MTFM, r'(t), as the outgoing bit for any edge which is in the hold state, however, if edge i is in a nonhold state it directly uses $r_i(t)$ as the outgoing bit for that edge.

The complexity of an MTFM can be significantly reduced by properly adjusting $T_m$ and $T_u$. FIG. 20 shows the reduced complexity implementation of architecture of an MTFM. In this structure, the TFM is only updated when all the input bits are regenerative, therefore, the update signal for the TFM, signal U, can be determined by a $d_v$-input AND gate (instead of the comparator in FIG. 19). Also, $T_m$ is set to $d_v/2$, hence, the most significant bit (MSB) of X(t) directly determines the majority and if the input bit of the TFM, r(t), is 0 or 1. Compared to the general architecture of MTFMs in FIG. 19, the reduced complexity MTFM uses one less adder and two less comparators.

Figure 21:
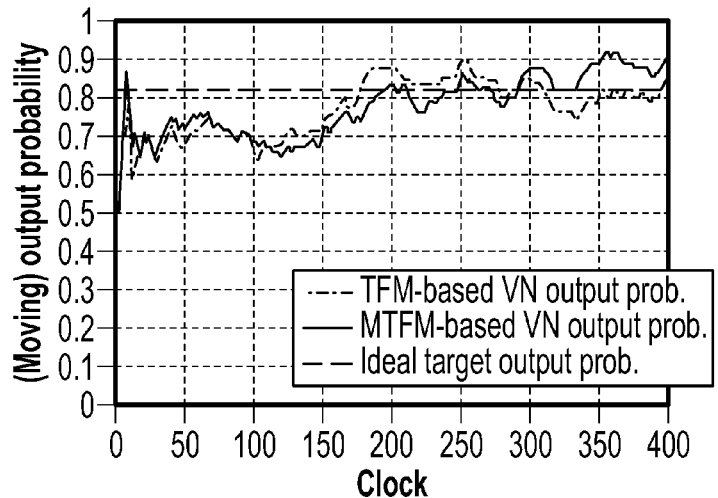
FIG. 21 is a graph of extracted output probability of an edge in degree-6 TFM-based and MTFM-based VNs.

As described previously, in an MTFM-based stochastic VN, the output bit for an edge is determined by the MTFM only when the edge is in the hold state. In nonhold (regular) states, the output bit for an edge is directly determined by the newly regenerative bit in both TFM and MTFM approaches. Therefore, the majority approximation made in the MTFM approach is only effective when an edge is in the hold state, and no approximation is made in non hold (regular) states. Also, the majority approximation used in MTFM approach is precise when the degree of the VN is high (usually, a degree of 4 or more). For instance, FIG. 21 shows the output probability of an edge in degree-6 TFM-based and MTFM-based VNs and compares them with the ideal target output probability computed according to floating-point SPA. Both VNs receive same input streams. As shown, the extracted output probabilities in both approaches closely follow the SPA's output probability.

Figure 22:
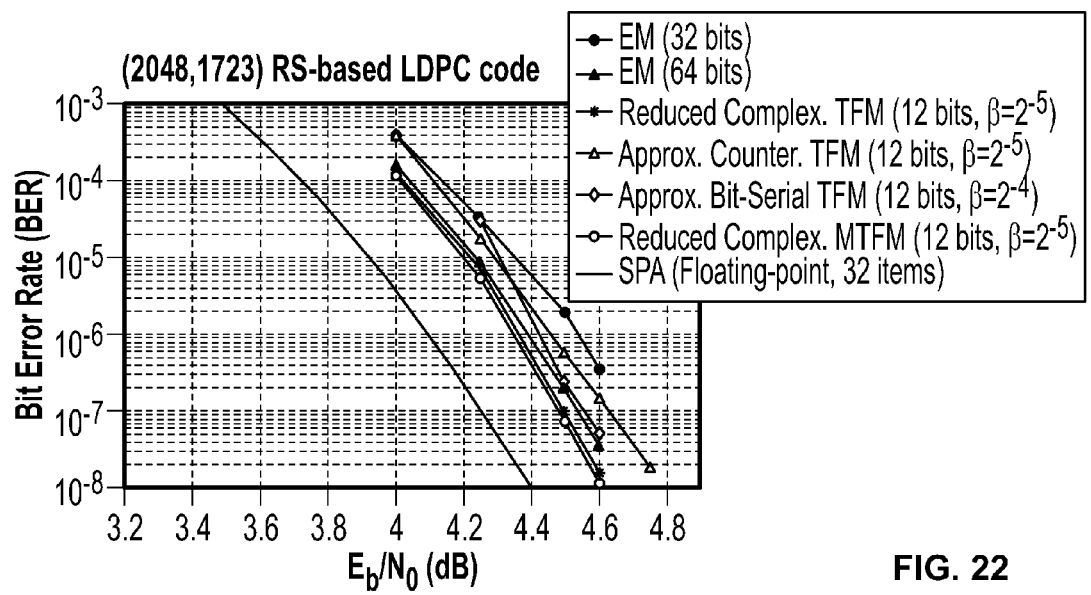
FIG. 22 is a graph of BER decoding performance of EM-based, TFM-based, and MTFM-based stochastic decoding approaches.

FIG. 22 compares the performance of EM, TFM and MTFM approaches for decoding the (2048,1723) LDPC code with de-gree-6 VNs and degree-32 PNs. Results reported for the MTFM approach in this section is based on the reduced complexity MTFM architecture that uses a reduced complexity TFM (see FIG. 12). For all of these approaches, received symbols from the channel are quantized to 6 bits and an early decoding termination, for example based on syndrome checking, until a maximum number of 400 clock cycles is used. As shown, the reduced complexity MTFM approach provides similar decoding performance com-pared to the TFM approach, which outperforms 64 bit and 32 bit EMs for decoding the (2048,1723) LDPC code. The performance loss of the MTFM approach compared to SPA with floating-point implementation and 32 iterations is about 0.2 dB loss. The figure also shows the decoding performance of approximate bit-serial and counter-based TFM approaches.

The (2048,1723) LDPC code from the IEEE 802.3 an standard is a regular Reed-Solomon (RS) based code [30] with degree-6 VNs and degree-32 PNs. This code is adopted for the standard to provide enough coding gain that allows for a BER level of $10^{-12}$ or less.

Figure 23:
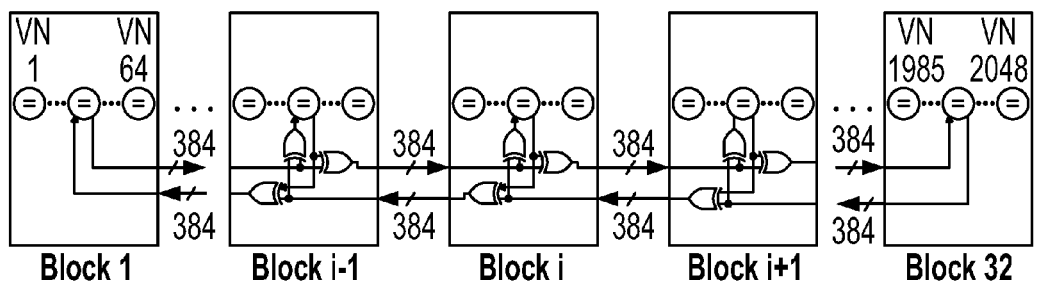
FIG. 23 is a simplified block diagram of the (2048,1723) stochastic decoder implemented using 32 VN blocks where each block contains 64 degree-6 VNs.

An implemented fully-parallel stochastic decoder instantiates 2048 MTFM-based degree-6 VNs and 384 degree-32 PNs based on the partitioned design shown in FIG. 23. The decoder uses flooding-schedule for updating VNs and PNs. The binary parity-check matrix of the (2048,1723) LDPC code is based on the permutation of 64×64 sub-matrices. This parity-check matrix is not full-rank and has 384 degree-32 PN. Each PN has exactly one connection to a VN in every 64 columns. Therefore, it is possible to partition the whole parity-check matrix into 32 VN blocks in which each block has 64 degree-6 VNs (see FIG. 15). In this configuration, each block receives 384 input bits from each one of its neighbor blocks and outputs 384 bits to each of them. To form the parity-check equation, each VN inside a block XORs its output bit with the input bit received from neighboring block and passes it to the next neighbor block. The VN also XORs the input bits received from the neighbor blocks to from its input bit. This method of partitioning relies on the split-row technique for MSA-based decoders; however, compared to the split-row technique for MSA it has the following major benefits.

In the split-row technique increasing the number of splits/partitions results in decoding performance loss and, possibly, a higher error-floor. Recently, MSA-based threshold decoding methods have been proposed for the split-row technique to reduce this performance loss. In stochastic decoders, however, partitioning PNs does not affect the decoding performance or the error-floor. This is because in the split-row technique for MSA, each PN is divided into lower degree PNs, assigned to each partition. These lower degree PNs calculate the minimum of only a portion of incoming messages. Therefore, their output is not necessarily the absolute minimum of all incoming messages received by the PN. As the number of splits increases, the approximation made in lower degree PNs becomes less accurate. In stochastic decoding, the PN operation is XOR-based, hence, as shown in FIG. 23, each lower degree PN can send its 1-bit outcome to neighboring PNs and, therefore, no approximation is made in the PN operation.

Increasing the number of partitions/splits results in long physical wires between VN blocks. These wires can become the bottleneck of the clock frequency and throughput. For instance in FIG. 23 the input signal of the VNs in the block number 32 starts from block 1 and passes through 30 VN blocks before reaching the block 32. Stochastic decoding benefits from asynchronous pipelining Asynchronous pipelining enables stochastic decoders to pipeline long wires with negligible effect on the average number of decoding cycles and throughput. By relying on this useful feature, nonuniform levels of registers can be inserted to pipeline the signals between VN blocks and break long wires to smaller segments in order to increase the clock frequency and throughput. In the implemented decoder three levels of flip-flops are used to segment these wires.

The decoder receives 6-bit input symbols from the channel. It applies log-likelihood ratio (LLR) scaling and converts these symbols to 7-bit probabilities using 56 byte lookup tables. The MTFM resolution in VNs is 11 bits and all the MTFMs are initialized to corresponding received channel probabilities prior the start of a decoding operation.

1) The stochastic decoder relies on (pseudo) random numbers at input comparators to convert probabilities to stochastic streams. Random numbers are also required in MTFMs to convert probabilities stored in MTFMs to stochastic streams. Random numbers used in the decoder are generated using a distributed random engine architecture, which consists of 64 independent random engines. Every two random engines are assigned to a VN block. Each random engine comprises of four 16-bit linear feedback shift registers (LFSRs) associated with different prime polynomials and generates an 11-bit random number that is shared among 32 VNs.

The VNs and PNs exchange bits until decoder output bits satisfy all the parity checks or, a maximum number of 400 clock cycles is exhausted. The final output symbol of each VN is determined by the majority of bits received from connected check nodes. The syndrome checking is performed in every clock cycle and hence the decoder stops decoding as soon as it finds a valid codeword. The syndrome check is performed by XORing the output bits of VNs that are connected to the same PNs. If the outcome of all of these XOR gates are zero, decoding terminates. The early termination logic consists of 384 32-input XOR gates whose 384 output bits are passed through a 384-input NOR gate or equivalently 383 2-input NOR gates in a tree configuration. Throughput of the decoder is determined by the average number of clock cycles used and the decoding latency is determined by the maximum number of clock cycles used.

Combining different decoding processes, for the sake of better performance or reduced latency is often advantageous. The ASIC stochastic decoder of the present embodiments a combined redecoding and postprocessing scheme to lower the error-floor of the 10GBASE-T LDPC code and enable the decoder to achieve a good BER decoding performance with less latency. Redecoding is an interesting feature of stochastic decoders which is useful for lowering the error-floor of LDPC codes. In stochastic decoding the decoding trajectory depends on the stream of random numbers generated for conversion of probabilities to stochastic bit streams. Consequently, by using different sequence of random numbers different decoding trajectories are possible. Therefore, if the decoding outcome does not converge to a codeword after some clock cycles, it is possible to restart the decoding operation with different random numbers (different decoding trajectory) to possibly converge to a codeword in the new round. For the case of the (2048,1723) LDPC code, it is known that the dominant error events in the error floor region are due to (8,8) absorbing sets. Redecoding in this respect helps to reduce these events by randomizing the decoding trajectory.

The ASIC stochastic decoder uses 4 rounds of decoding for 5 dB in which each decoding round uses a maximum number of 100 clock cycles (i.e., a maximum of 400 clock cycles including redecoding and postprocessing). In rounds 1 to 3 of decoding the stochastic decoding is performed for 92 clock cycles. In the last 8 clock cycles of these decoding rounds, the ASIC decoder uses a postprocessing scheme to correct the re-maining bit errors. During the postprocessing mode, the output bit of each VN is directly sent to PNs. The PNs perform the parity-check operation and send back their bit messages to VNs. This postprocessing scheme can efficiently correct remaining bits errors provided they are few. When the number of bit errors are high, this scheme may result in propagation of errors in the entire graph, therefore, the ASIC decoder only uses this postprocessing scheme at the end of decoding rounds 1, 2, and 3 and does not use it for the last round. If the syndrome check is not satisfied during decoding rounds 1 to 3, all MTFMs are reset to the corresponding channel probabilities and the next round of decoding is started. In the last round of decoding (round 4), stochastic decoding is performed for a maximum of 100 clock cycles.

Numerous other embodiments of the invention will be apparent to persons skilled in the art without departing from the spirit and scope of the invention as defined in the appended claims.

What is claimed is:

1. A method comprising:
   receiving one of a pseudo random number and a random number;
   receiving an input symbol of a stochastic signal data stream;
   determining, by a decoder, a following probability of the stochastic signal data stream in dependence upon the input symbol and a present probability of the stochastic data stream;
   determining, by the decoder, an output symbol of the stochastic signal data stream in dependence upon a comparison of the following probability of the stochastic signal data stream with the received one of a pseudo random number and a random number; and
   providing, by the decoder, the output symbol.

2. A method according to claim 1, wherein the following probability of the stochastic signal data stream is determined in further dependence upon a predetermined coefficient.

3. A method according to claim 2, comprising:
   replacing the present probability of the stochastic signal data stream with the following probability of the stochastic signal data stream.

4. A method according to claim 2, wherein the predetermined coefficient is at least one of:
   varied during processing of the stochastic signal data stream; and
   determined in dependence upon a performance of a process processing the stochastic signal data stream.

5. A method according to claim 2, wherein the predetermined coefficient is determined in dependence upon at least one of an operating signal to noise ratio, a bit error ratio performance of the method, and convergence of the method.

6. A method according to claim 3, wherein the determining of the following probability of the stochastic signal data stream comprises:
   subtracting the present probability of the stochastic signal data stream multiplied with the predetermined coefficient from the present probability of the stochastic signal data stream; and
   adding the input symbol multiplied with the predetermined coefficient to the present probability of the stochastic signal data stream.

7. A method according to claim 2, wherein the predetermined coefficient is a fixed value during processing of the stochastic signal data stream in the method, and
   wherein the fixed value being a negative power of two.

8. A method according to claim 1, comprising: replacing the present probability of the stochastic signal data stream with the following probability of the stochastic signal data stream.

9. A method according to claim 1,
   wherein the following probability of the stochastic signal data stream is determined in further dependence upon a predetermined coefficient; and
   wherein the predetermined coefficient is determined in dependence upon at least one of an operating signal to noise ratio, a bit error ratio performance of the method, and convergence of the method.

10. A method according to claim 1, wherein the input symbol and the output symbol each consists of one bit.

11. A method according to claim 1, comprising:
    replacing the present probability of the stochastic signal data stream with another probability of the stochastic signal data stream selected in dependence upon the received one of a pseudo-random number and a random number in order to re-randomize a plurality of symbols therein.

12. A method according to claim 1, wherein the determining of the following probability is solely based on regenerative bits.

13. A method according to claim 2, wherein the determining of the following probability is solely based on regenerative bits.

14. A system comprising:
    a first input port for receiving an input symbol of a stochastic signal data stream;
    a second input port for receiving one of a pseudo random number and a random number;
    a probability circuitry connected to the first input port for determining a following probability of the stochastic signal data stream in dependence upon at least the input symbol and a present probability of the stochastic signal data stream;
    a memory connected to the probability circuitry for storing the present probability of the stochastic signal data stream;
    a comparison circuitry connected to the probability circuitry and the second input port for determining an output symbol of the stochastic signal data stream in dependence upon a comparison of the following probability of the stochastic signal data stream with the received one of a pseudo random number and a random number; and,
    an output port connected to the comparison circuitry for providing the output symbol.

15. A system according to claim 14, wherein the probability circuitry is connected to the memory such that the present probability of the stochastic signal data stream is provided to the probability circuitry and the following probability of the stochastic signal data stream is provided to the memory.

16. A system according to claim 14, wherein the probability circuitry comprises:
    a first probability multiplication circuitry for multiplying the present probability of the stochastic signal data stream with a predetermined coefficient to determine a multiplication result and
    a subtractor for subtracting the multiplication result from the present probability of the stochastic signal data stream.

17. A system according to claim 16, wherein the first circuitry comprises a multiplier.

18. A system according to claim 16, wherein the first circuitry comprises a shifter.

19. A system according to claim 16, wherein the probability circuitry comprises:
    an input symbol multiplication circuitry for multiplying the input symbol with the predetermined coefficient; and
    an adder connected to the subtractor.

20. A system according to claim 19, wherein the input symbol multiplication circuitry comprises a multiplexer.

21. A system according to claim 14, wherein the comparison circuitry comprises a comparator.

* * * * *